United States Patent
Go et al.

(10) Patent No.: US 12,069,688 B2
(45) Date of Patent: Aug. 20, 2024

(54) METHOD FOR TRANSMITTING/RECEIVING DOWNLINK SIGNAL IN WIRELESS COMMUNICATION SYSTEM, AND DEVICE THEREFOR

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 17/595,180

(22) PCT Filed: May 13, 2020

(86) PCT No.: PCT/KR2020/006273
§ 371 (c)(1),
(2) Date: Nov. 10, 2021

(87) PCT Pub. No.: WO2020/231170
PCT Pub. Date: Nov. 19, 2020

(65) Prior Publication Data
US 2022/0225389 A1    Jul. 14, 2022

Related U.S. Application Data

(60) Provisional application No. 62/847,309, filed on May 13, 2019.

(51) Int. Cl.
*H04W 72/23*   (2023.01)
*H04B 17/373*  (2015.01)
*H04L 5/00*    (2006.01)

(52) U.S. Cl.
CPC .......... *H04W 72/23* (2023.01); *H04B 17/373* (2015.01); *H04L 5/0051* (2013.01)

(58) Field of Classification Search
CPC ... H04L 5/0051; H04L 5/0003; H04L 5/0092; H04L 5/0044; H04L 5/0091;
(Continued)

(56) References Cited

U.S. PATENT DOCUMENTS

2015/0029989 A1*  1/2015  Shiizaki ............... H04W 72/20
                                                         370/329
2019/0141691 A1   5/2019  Kwon et al.
(Continued)

FOREIGN PATENT DOCUMENTS

KR    20190028336    3/2019
WO    2019049096     3/2019

OTHER PUBLICATIONS

PCT International Application No. PCT/KR2020/006273, International Search Report dated Aug. 20, 2020, 5 pages.
(Continued)

*Primary Examiner* — Kiet Tang
(74) *Attorney, Agent, or Firm* — LEE, HONG, DEGERMAN, KANG & WAIMEY

(57) ABSTRACT

A method for a terminal receiving a downlink signal in a wireless communication system, according to one embodiment of the present specification, comprises the steps of: receiving configuration information associated with a Transmission Configuration Indicator (TCI) state; and receiving a downlink signal on the basis of the configuration information. The configuration information includes information indicating an uplink (UL) reference RS, and the downlink signal is received on the basis of a spatial domain filter associated with the UL reference RS.

11 Claims, 25 Drawing Sheets

(58) Field of Classification Search
CPC ... H04L 5/0094; H04L 5/0023; H04B 7/0404; H04B 7/0691; H04B 7/0695; H04B 7/0408; H04W 52/42; H04W 72/046; H04W 72/1268; H04W 72/21; Y02D 30/70

See application file for complete search history.

(56) References Cited

U.S. PATENT DOCUMENTS

2020/0162144 A1\* 5/2020 Zhou .................... H04B 7/0628
2022/0104031 A1\* 3/2022 Matsumura ........... H04W 72/23

OTHER PUBLICATIONS

Ericsson, "Enhancements to multi-beam operation," Tdoc R1-1905156, 3GPP TSG-RAN WG1 Meeting #96bis, Apr. 2019, 16 pages.
Samsung, "Issues on beam management," R1-1800432, 3GPP TSG RAN WG1 Meeting AH 1801, Jan. 2018, 12 pages.

\* cited by examiner

【FIG. 1】
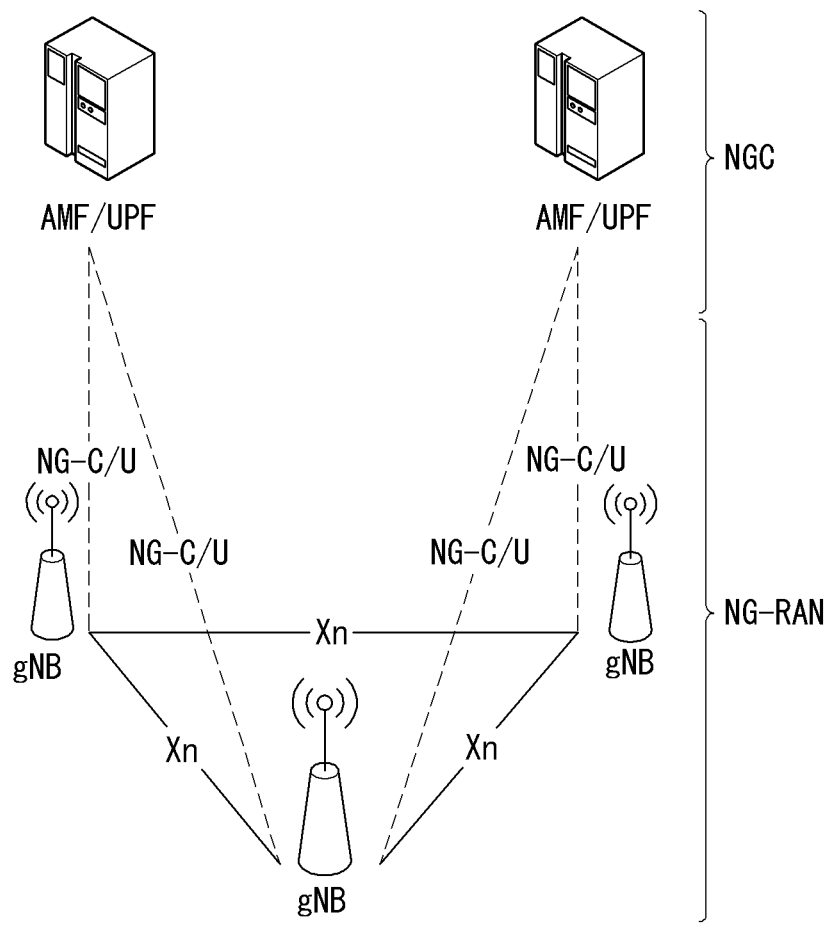
【FIG. 2】
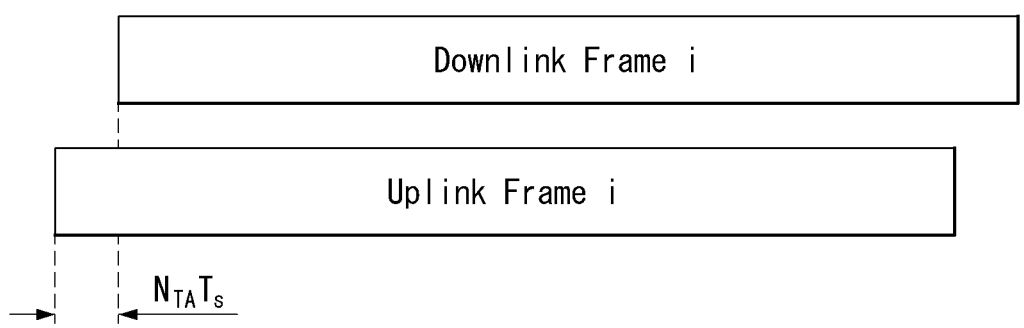

[FIG. 3]
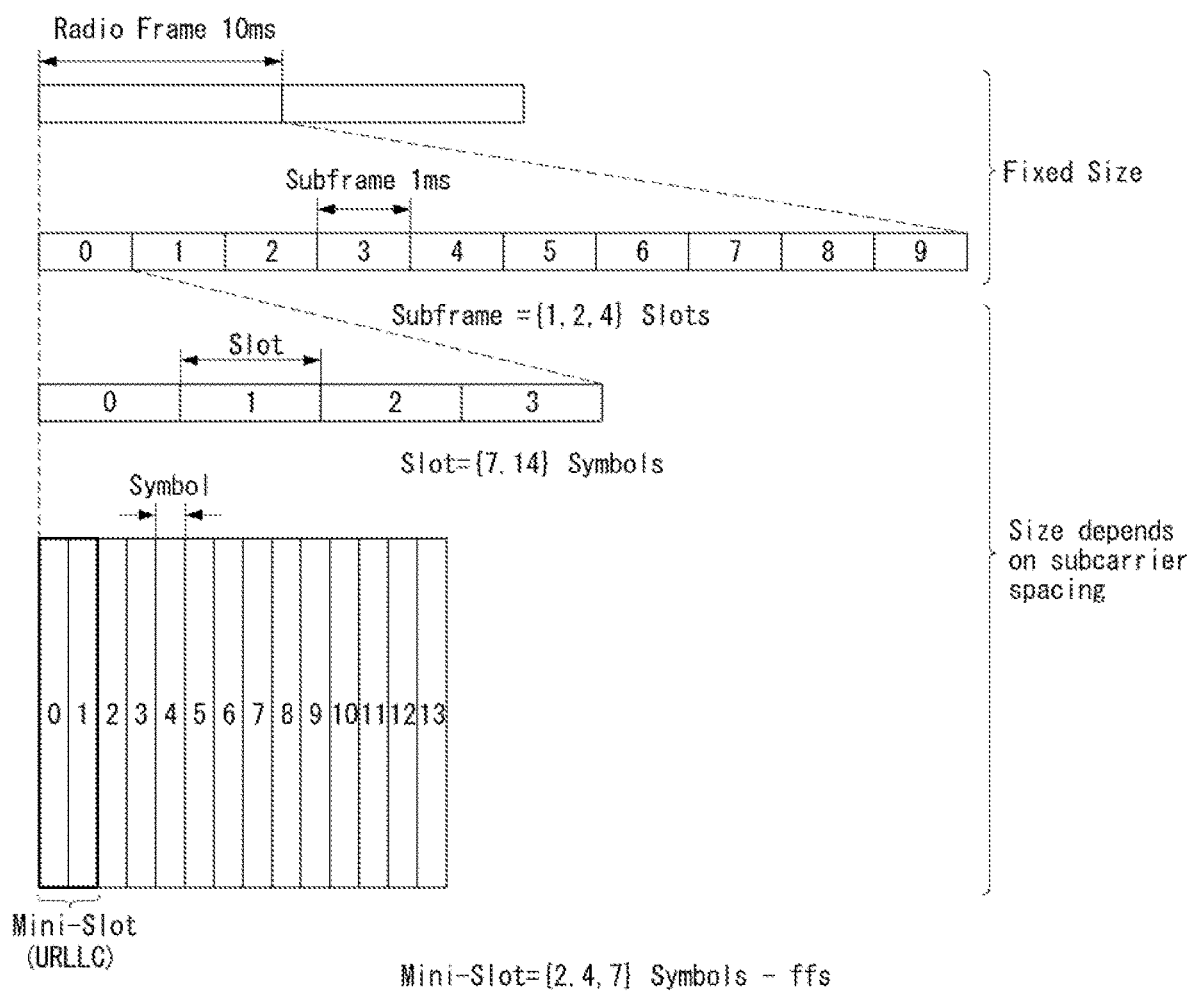

[FIG. 4]
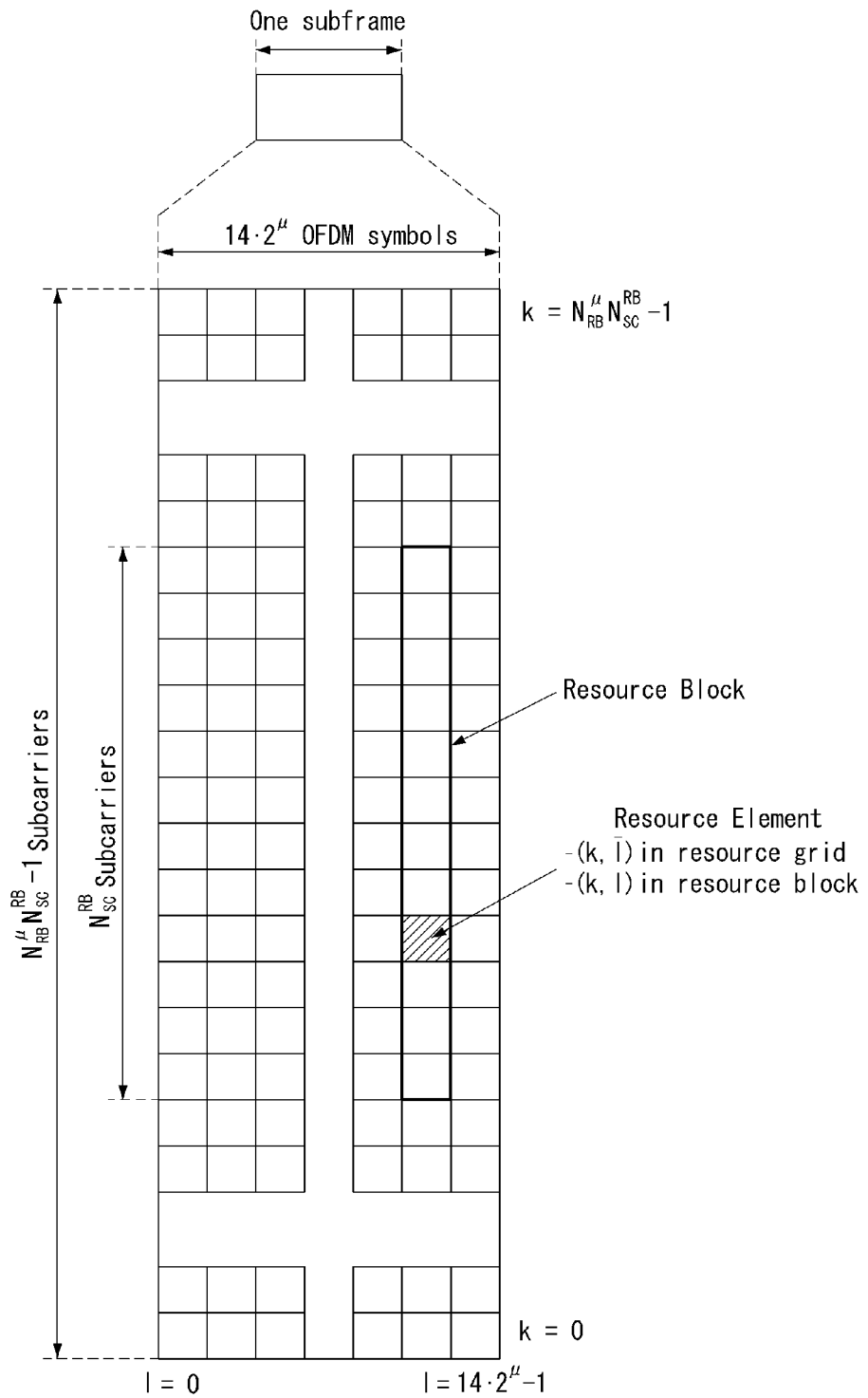

[FIG. 5]
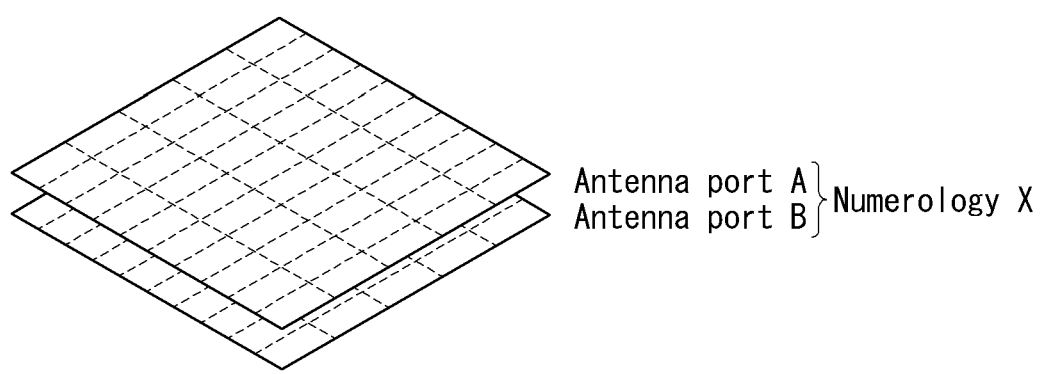
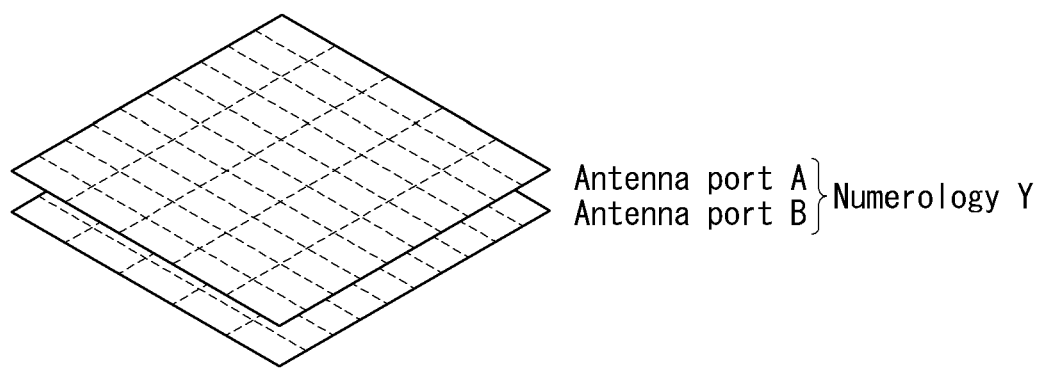

[FIG. 6]
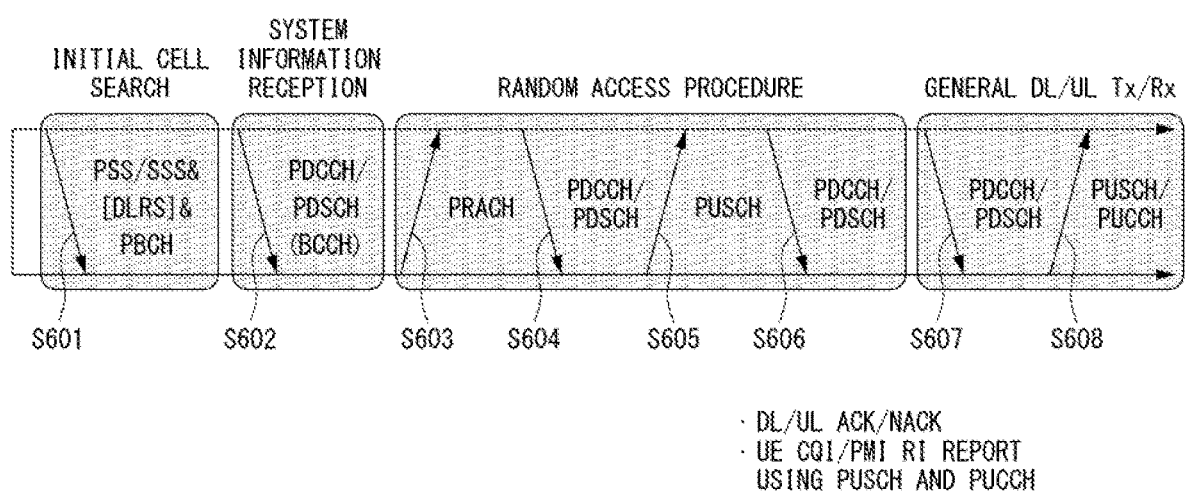

[FIG. 7]
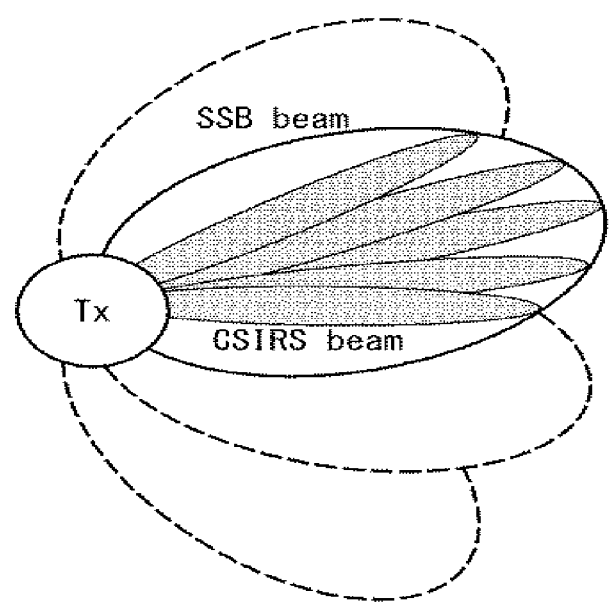

[FIG. 8]
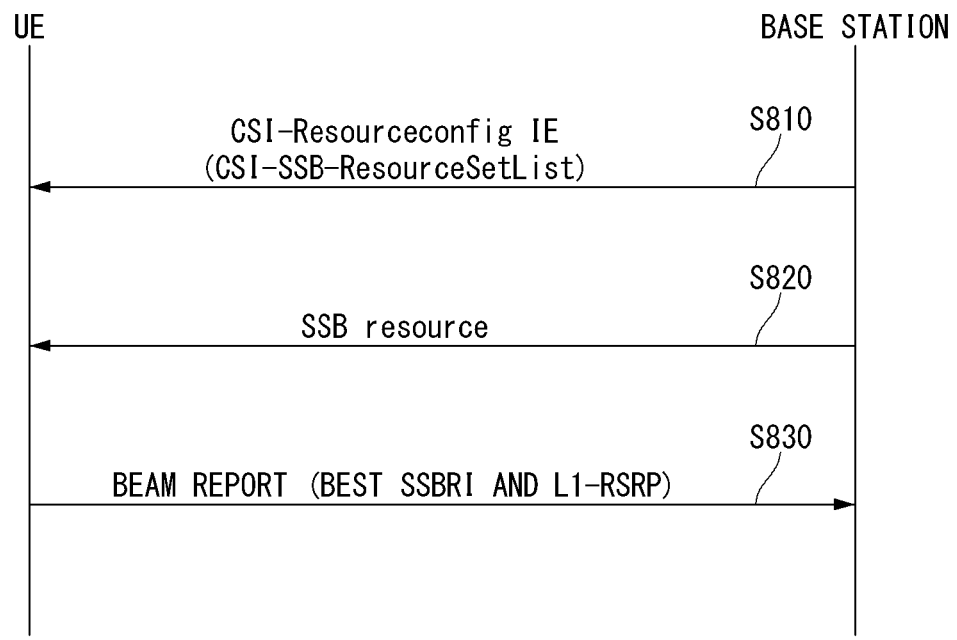

【FIG. 9】
(a) 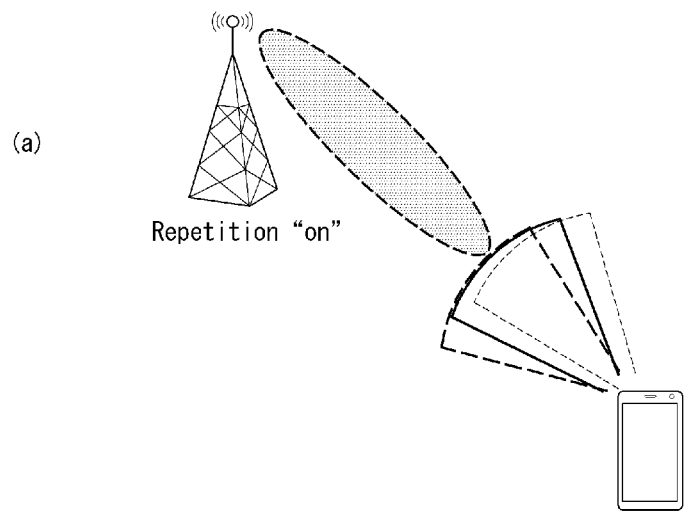
Repetition "on"
(b) 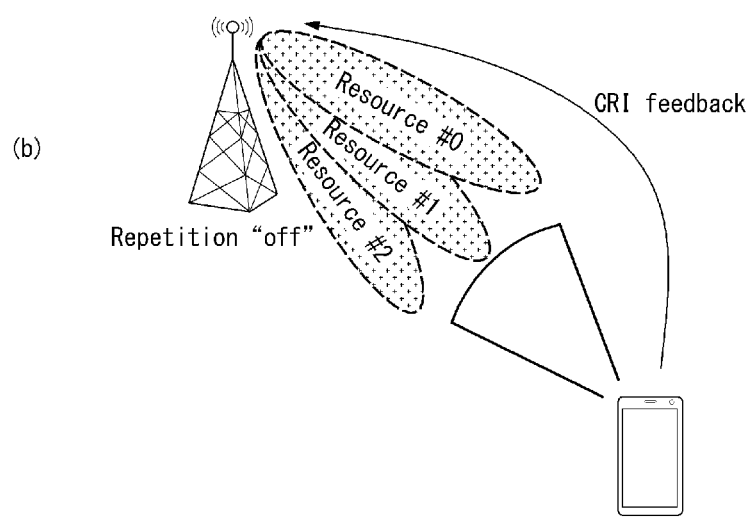
Repetition "off"

[FIG. 10]
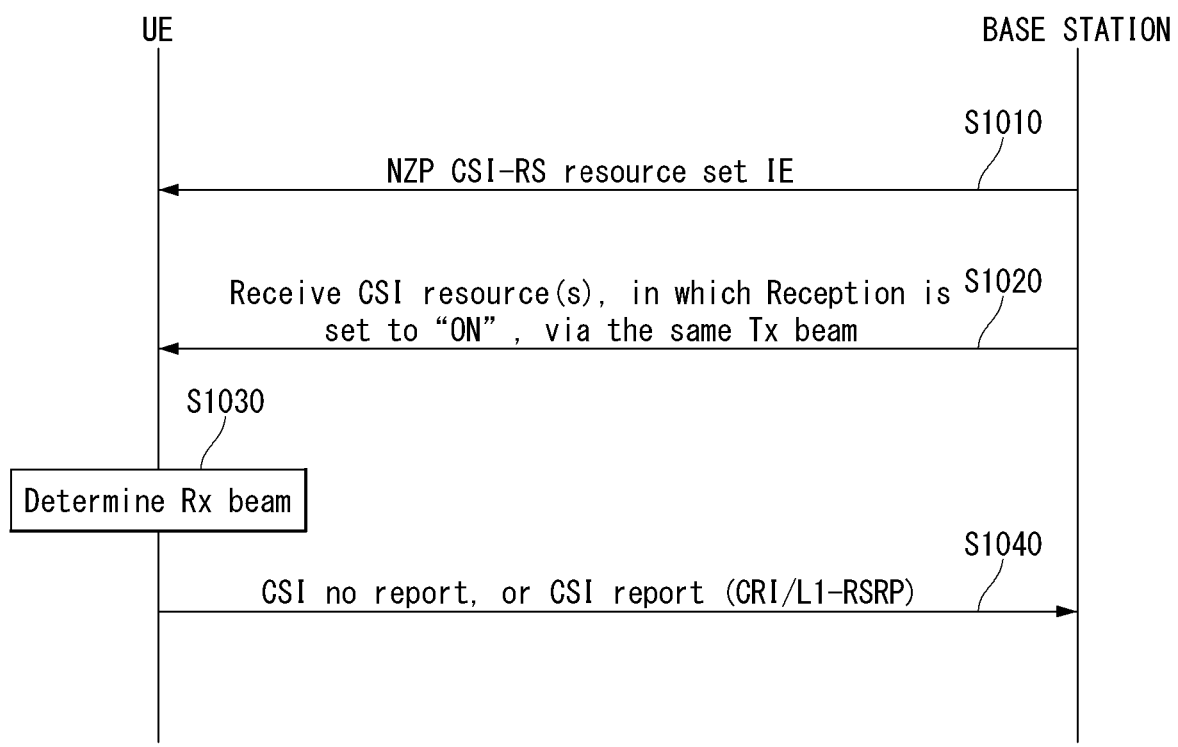

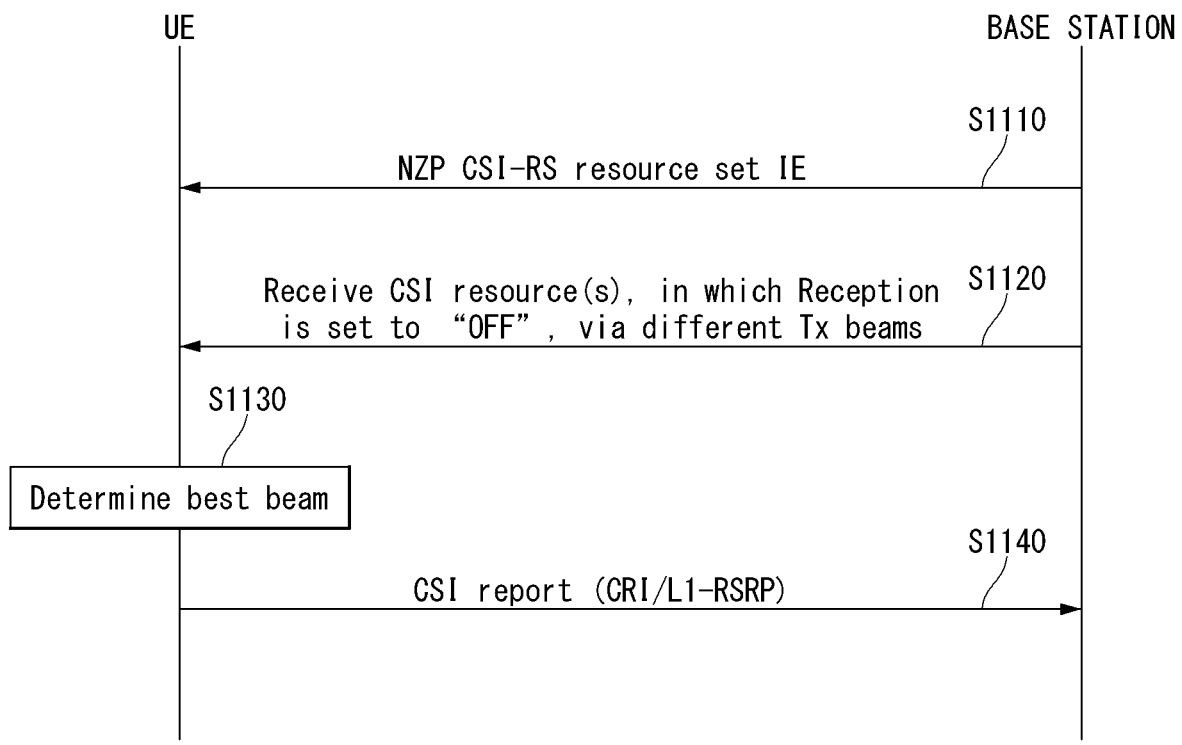
[FIG. 11]

[FIG. 12]
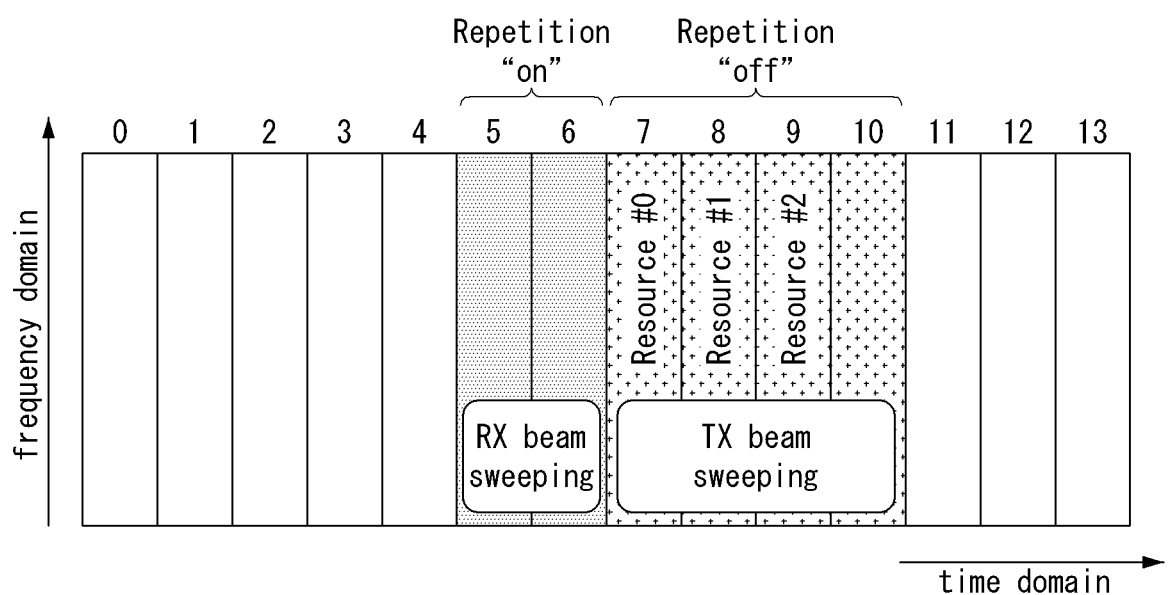

[FIG. 13]
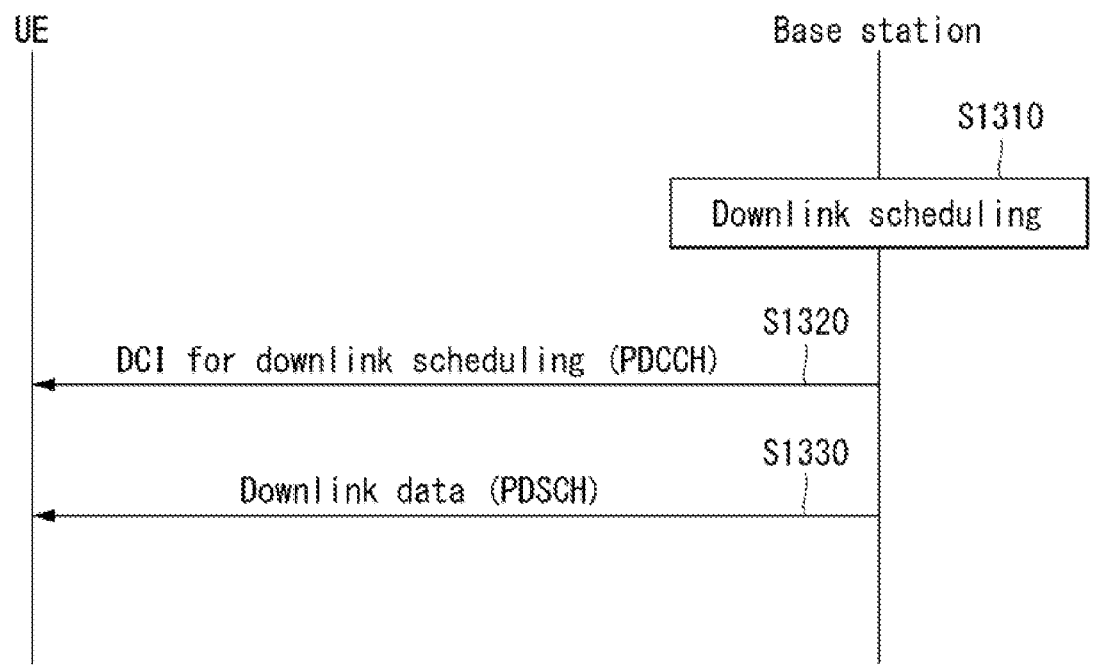

[FIG. 14]
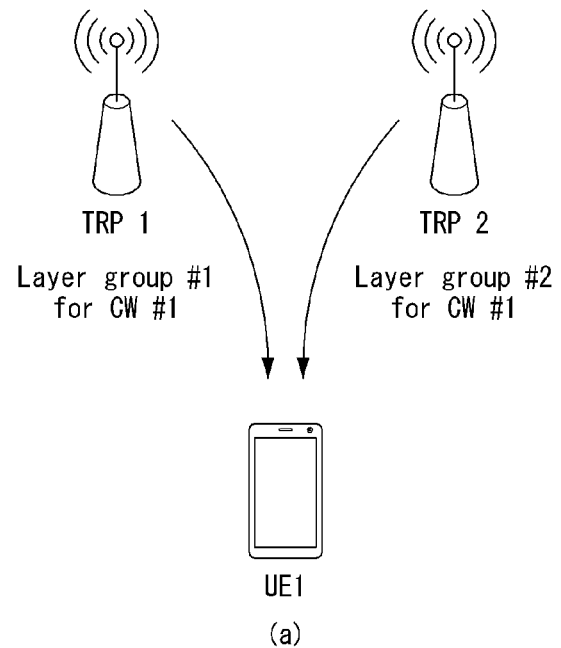
(a)
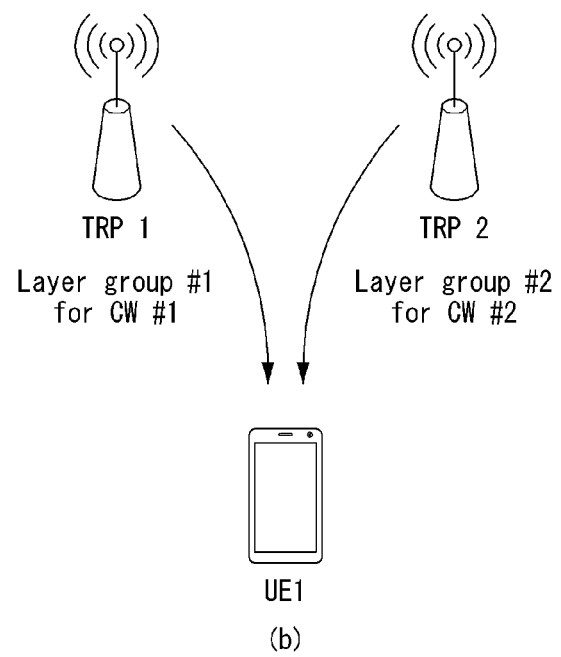
(b)

[FIG. 15]
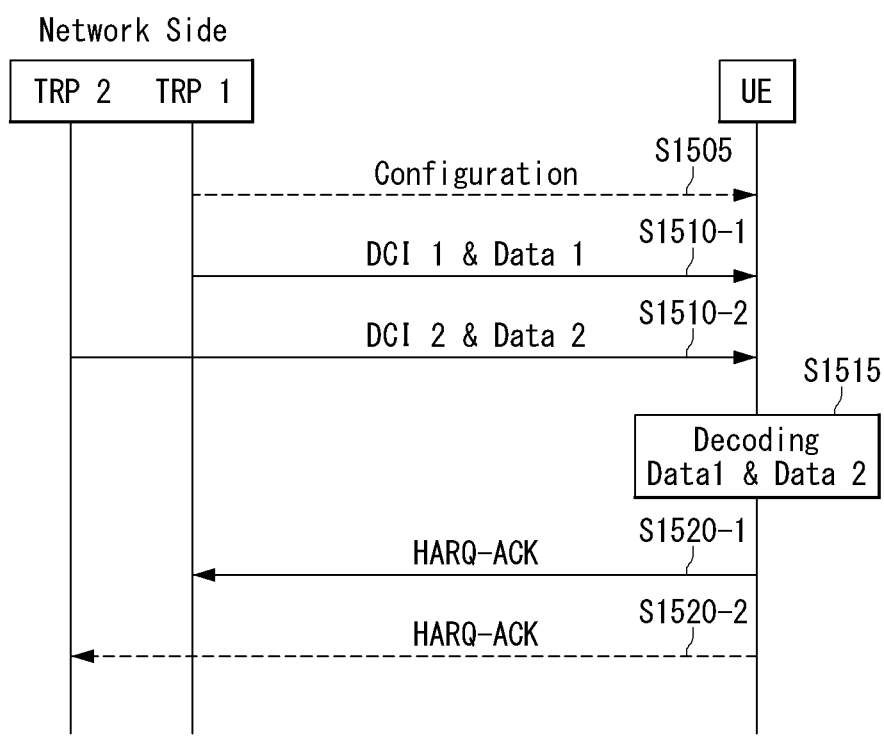

[FIG. 16]
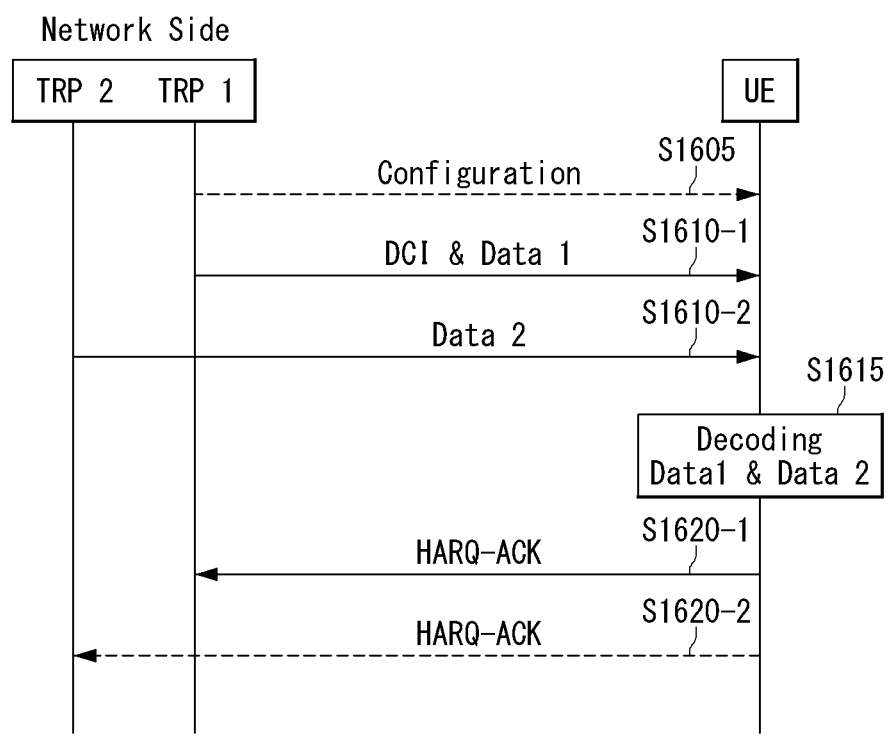

[FIG. 17]
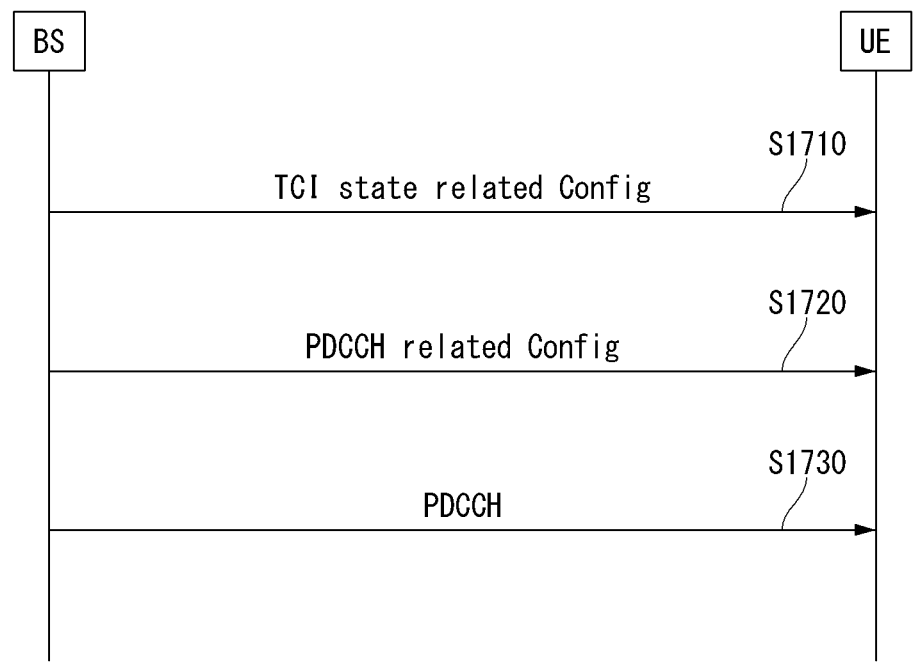

[FIG. 18]
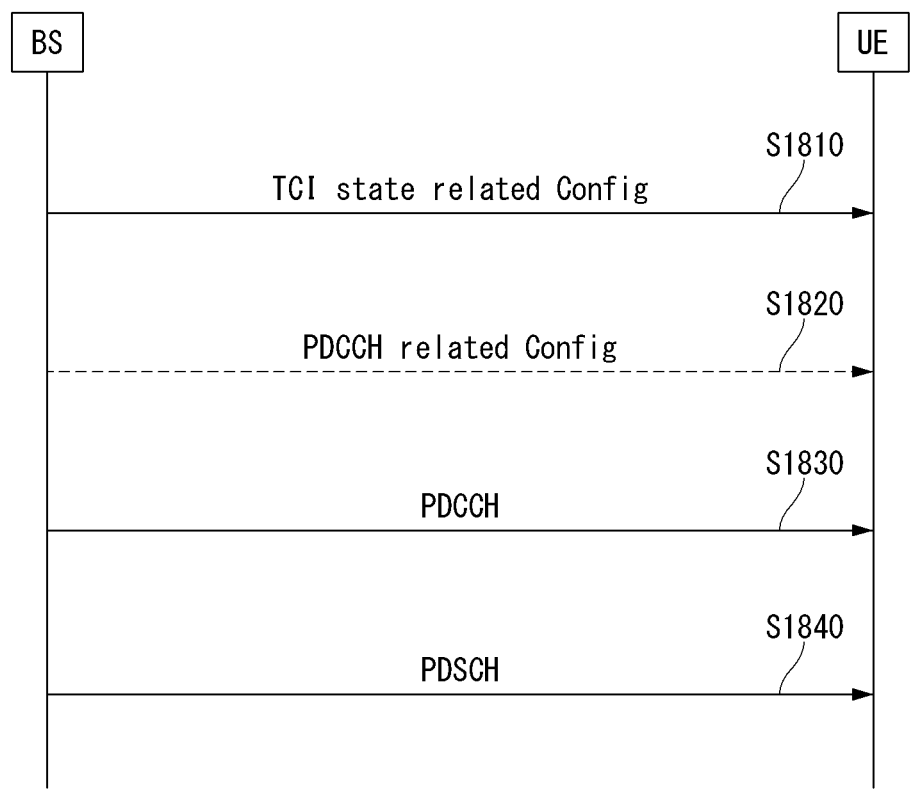

[FIG. 19]
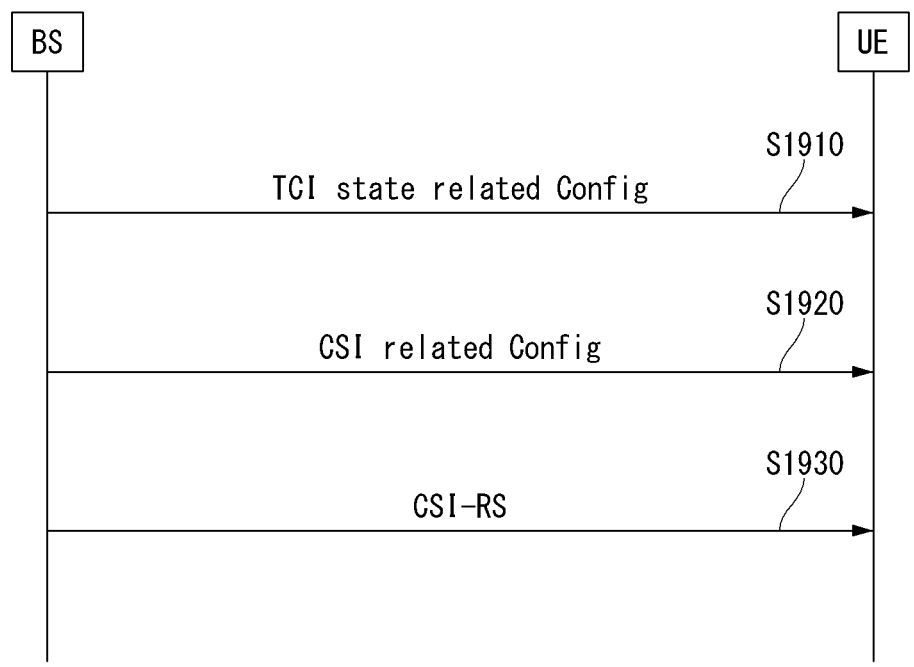

[FIG. 20]
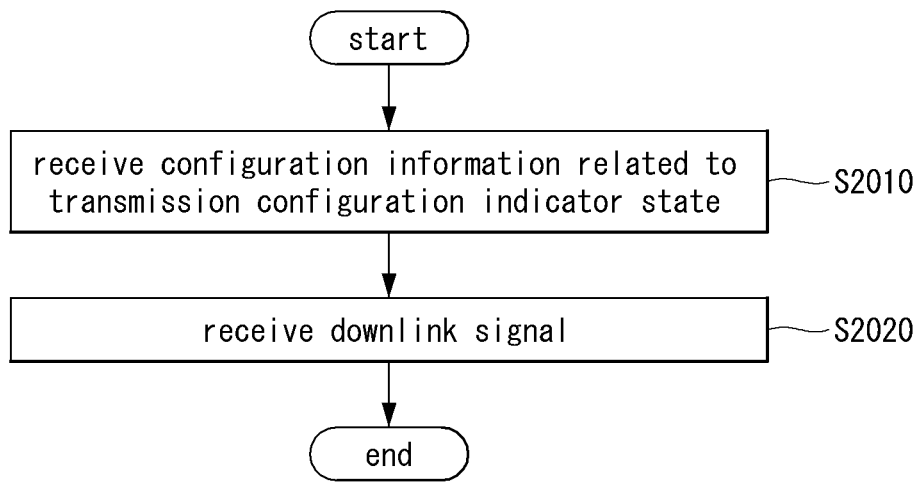

[FIG. 21]
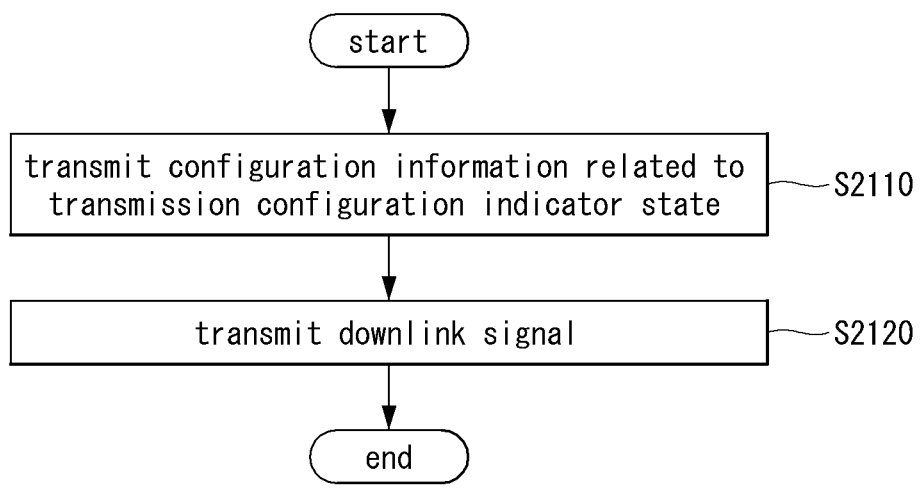

[FIG. 22]
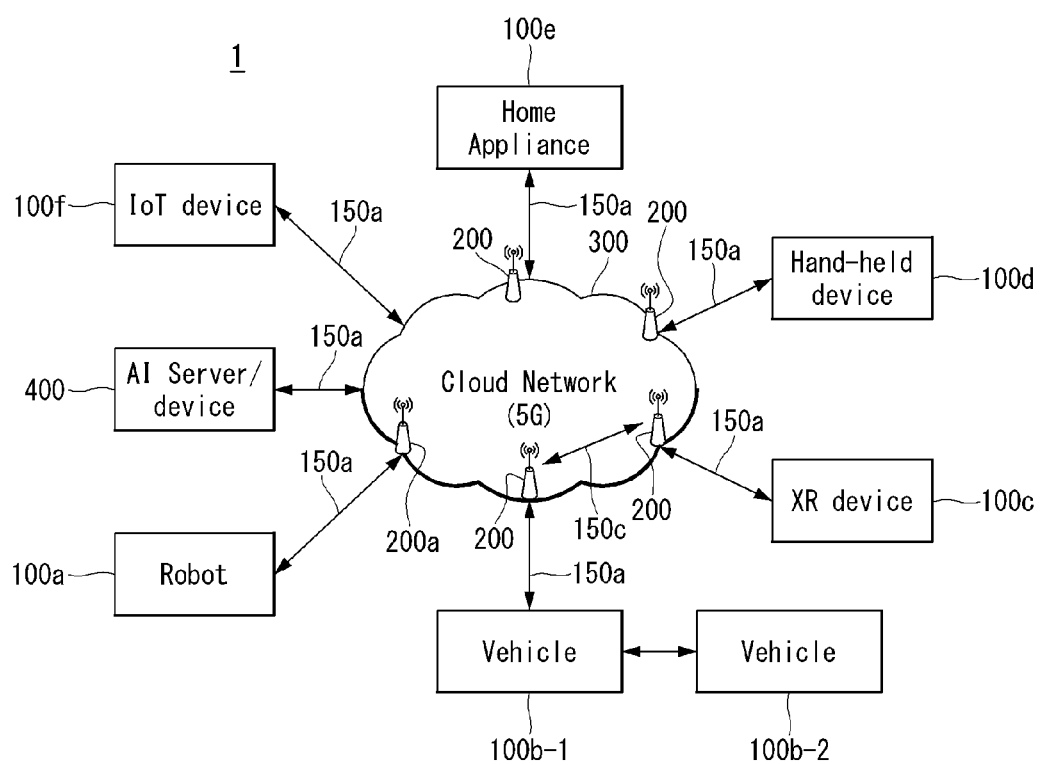

[FIG. 23]
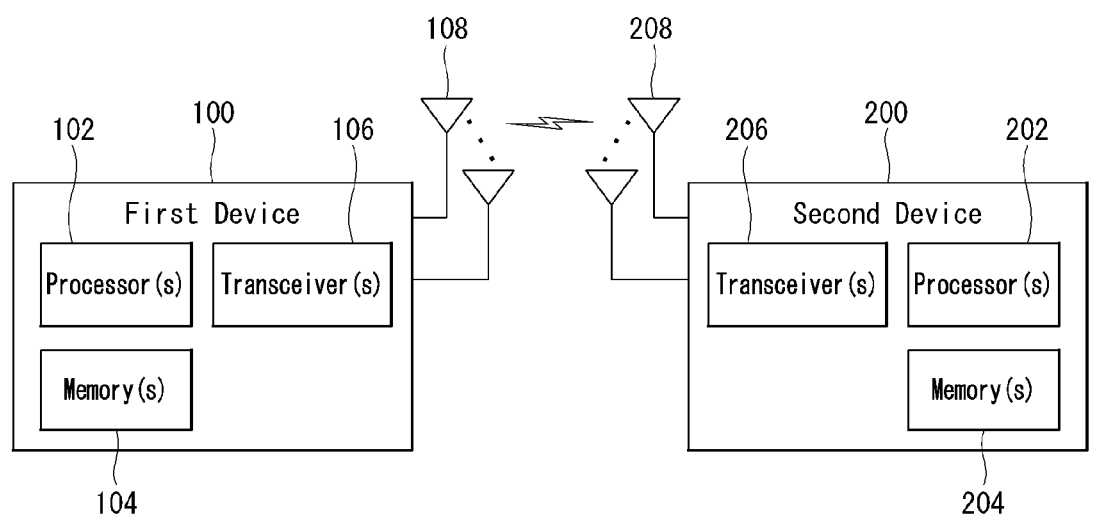

[FIG. 24]
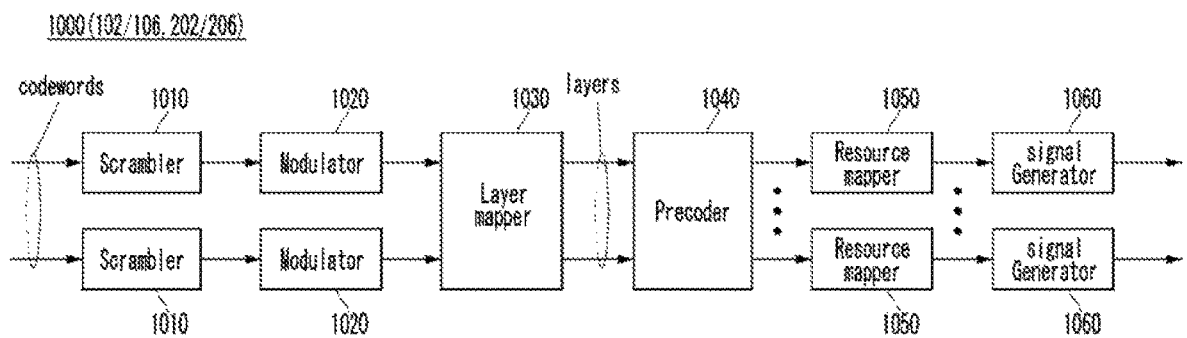

[FIG. 25]
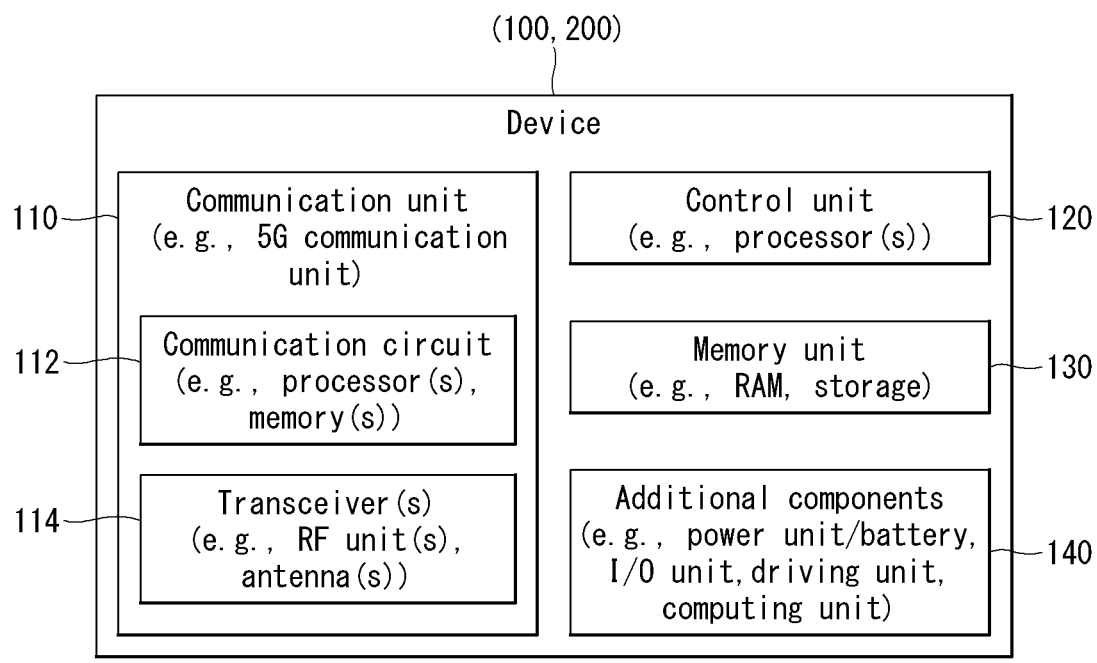

[FIG. 26]
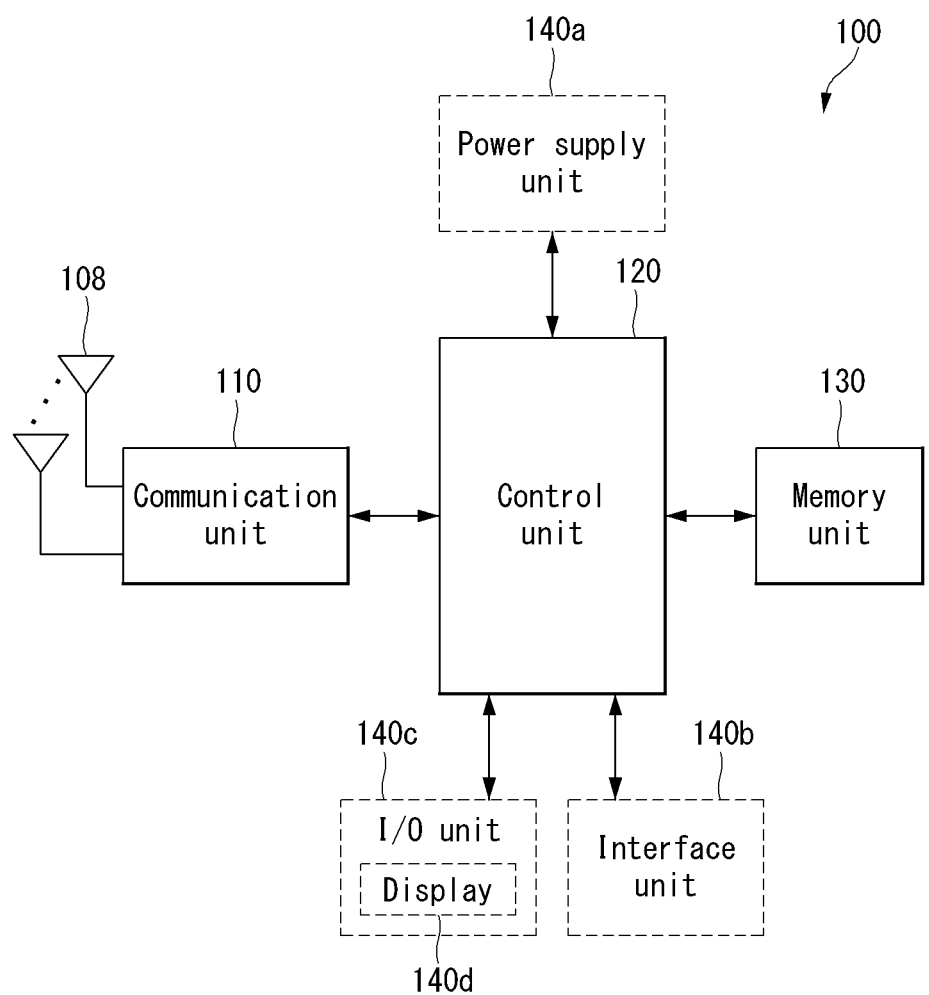

METHOD FOR TRANSMITTING/RECEIVING DOWNLINK SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/006273, filed on May 13, 2020, which claims the benefit of U.S. Provisional Application No. 62/847,309, filed on May 13, 2019, the contents of which is hereby incorporated by reference herein in its entirety.

TECHNICAL FIELD

The disclosure relates to a method for transmitting/receiving a downlink signal and a device therefor in a wireless communication system.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DETAILED DESCRIPTION OF THE DISCLOSURE

Technical Problem

The disclosure proposes a method for transmitting a downlink signal. Specifically, the disclosure proposes operations related to a beam indication for reception of a downlink signal.

The technical objects of the disclosure are not limited to the aforementioned technical objects, and other technical objects, which are not mentioned above, will be apparently appreciated by a person having ordinary skill in the art from the following description.

Technical Solution

According to an embodiment of the disclosure, a method for receiving a downlink signal by a user equipment (UE) in a wireless communication system comprises receiving configuration information related to a transmission configuration indicator (TCI) state and receiving the downlink signal based on the configuration information.

The configuration information includes information indicating an uplink (UL) reference RS. The downlink signal is received based on a spatial domain filter related to the UL reference RS.

The spatial domain filter may be based on a spatial domain Rx filter corresponding to a spatial domain Tx filter for transmission of the UL reference RS.

The uplink reference RS may be based on a sounding reference signal (SRS).

The information indicating the UL reference RS may be based on a sounding reference signal resource indicator (SRI).

The SRS may be based on any one of a periodic SRS, a semi-persistent SRS, or an aperiodic SRS.

The SRS may be based on an SRS most recently transmitted before the configuration information is transmitted.

The SRS may be based on an activated semi-persistent SRS.

The most recently transmitted SRS may be based on an SRS transmitted in specific time duration before a time when the configuration information is transmitted.

The method may further comprise transmitting UE capability information related to the specific time duration.

The UL reference RS may be based on a specific QCL type. The specific QCL type may be based on i) a QCL type different from a QCL type related to a spatial relation or ii) a QCL type configured separately from the QCL type related to the spatial relation.

According to another embodiment of the disclosure, a UE receiving a downlink signal in a wireless communication system comprises one or more transceivers, one or more processors controlling the one or more transceivers, and one or more memories operably connectible to the one or more processors and storing instructions to, when the reception of the signal is executed by the one or more processors, perform operations.

The operations include receiving configuration information related to a transmission configuration indicator (TCI) state and receiving the downlink signal based on the configuration information.

The configuration information includes information indicating an uplink (UL) reference RS. The downlink signal is received based on a spatial domain filter related to the UL reference RS.

According to still another embodiment of the disclosure, a device includes one or more memories and one or more processors functionally connected with the one or more memories.

The one or more processors are configured to enable the device to receive configuration information related to a transmission configuration indicator (TCI) state and receive a downlink signal based on the configuration information.

The configuration information includes information indicating an uplink (UL) reference RS. The downlink signal is received based on a spatial domain filter related to the UL reference RS.

According to another embodiment of the disclosure, one or more non-transitory computer-readable media store one or more instructions.

One or more instructions executable by one or more processors are configured to enable the device to receive configuration information related to a transmission configuration indicator (TCI) state and receive a downlink signal based on the configuration information.

The configuration information includes information indicating an uplink (UL) reference RS. The downlink signal is received based on a spatial domain filter related to the UL reference RS.

According to another embodiment of the disclosure, a method for transmitting a downlink signal by a base station in a wireless communication system comprises transmitting configuration information related to a transmission configuration indicator (TCI) state and transmitting the downlink signal based on the configuration information.

The configuration information includes information indicating an uplink (UL) reference RS. A spatial domain filter for receiving the downlink signal is related to the UL reference RS.

According to another embodiment of the disclosure, a base station transmitting a downlink signal in a wireless communication system comprises one or more transceivers, one or more processors controlling the one or more transceivers and one or more memories operably connectible to the one or more processors and storing instructions to, when the transmission of the downlink signal is executed by the one or more processors, perform operations.

The operations include transmitting configuration information related to a transmission configuration indicator (TCI) state and transmitting the downlink signal based on the configuration information.

The configuration information includes information indicating an uplink (UL) reference RS. A spatial domain filter for receiving the downlink signal is related to the UL reference RS.

Advantageous Effects

According to an embodiment of the disclosure, configuration information related to a transmission configuration indicator (TCI) state includes information indicating an uplink reference RS (UL reference RS). A downlink signal is received based on the configuration information. Specifically, the downlink signal may be received based on a spatial domain filter related to the UL reference RS.

Accordingly, since an uplink reference signal (UL RS) is directly used as a reference RS for downlink beam indication, latency is reduced. Further, flexibility may be enhanced in an operation related to spatial relation configuration/association for indicating a downlink beam.

According to an embodiment of the disclosure, the uplink reference RS may be based on a sounding reference signal (SRS), and the SRS may be based on the most recently transmitted SRS before the configuration information is transmitted. Accordingly, ambiguity in the operation of the UE related to the reception beam determination based on the reception beam indication of the downlink signal may be removed.

According to an embodiment of the disclosure, the most recently transmitted SRS may be based on an SRS transmitted in specific time duration before a time when the configuration information is transmitted. In other words, the uplink reference RS (i.e., SRS) for indicating the reception beam of the downlink signal may be configured considering the time required for calculating and setting the uplink beam weight of the corresponding UE. Accordingly, the reception beam indication of the downlink signal may be performed more effectively based on the capability of the corresponding UE.

Effects which may be obtained by the disclosure are not limited to the aforementioned effects, and other technical effects not described above may be evidently understood by a person having ordinary skill in the art to which the disclosure pertains from the following description.

BRIEF DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission used in a 3GPP system.

FIG. 7 illustrates an example of beam forming using SSB and CSI-RS.

FIG. 8 is a flowchart for illustrating a downlink beam management procedure using SSB.

FIG. 9 illustrates for illustrating a downlink beam management procedure using CSI-RS.

FIG. 10 is a diagram for explaining a procedure for determining a reception beam in a downlink beam management procedure using CSI-RS.

FIG. 11 is a diagram for explaining a procedure for determining a transmission beam in a downlink beam management procedure using CSI-RS.

FIG. 12 is a diagram for explaining resource allocation in time and frequency domains in a downlink beam management procedure using CSI-RS.

FIG. 13 illustrates an example of downlink transmission/reception operation.

FIG. 14 illustrates an example of a transmission/reception method for reliability enhancement using transmission in multiple TRPs.

FIG. 15 is a flowchart for describing an example of a signaling procedure between a network side and a UE to which methods proposed in the disclosure may be applied.

FIG. 16 is a flowchart for describing another example of a signaling procedure between a network side and a UE to which methods proposed in the disclosure may be applied.

FIG. 17 is a flowchart illustrating an example of signaling related to transmission/reception of a PDCCH to which methods proposed in the disclosure may be applied.

FIG. 18 is a flowchart illustrating an example of signaling related to transmission/reception of a PDSCH to which methods proposed in the disclosure may be applied.

FIG. 19 is a flowchart illustrating an example of signaling related to transmission/reception of CSI-RS to which methods proposed in the disclosure may be applied.

FIG. 20 is a flowchart illustrating a method for receiving a downlink signal by a UE in a wireless communication system according to an embodiment of the disclosure.

FIG. 21 is a flowchart illustrating a method for transmitting a downlink signal by a base station in a wireless communication system according to another embodiment of the disclosure.

FIG. 22 illustrates a communication system 1 applied to the disclosure.

FIG. 23 illustrates a wireless device applicable to the disclosure.

FIG. 24 illustrates a signal processing circuit for a transmission signal.

FIG. 25 illustrates another example of a wireless device applied to the disclosure.

FIG. 26 illustrates a portable device applied to the disclosure.

MODE FOR CARRYING OUT THE INVENTION

A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR (Augmented Reality) device, VR (Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR (Augmented Reality) device, VR (Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the disclosure may be referred to for a background art, terms, abbreviations, etc., used for describing the disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication become increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$ and $N_f = 4096$. DL and UL transmission is configured as a radio frame having a section of $T_f(\Delta f_{max} N_f/100) \cdot T_s = 10$ ms. The radio frame is composed of ten subframes each having a section of $T_{sf}(\Delta f_{max} N_f/1000) \cdot T_s = 1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots,\mu} - 1\}$ within a subframe and are numbered in increasing order of $n_{s,f}^\mu \in \{0, \ldots, N_{frame}^{slots,\mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP.

Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu}N_{sc}^{RB}$ subcarriers, and $2\mu N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using SSB and CSI-RS.

As illustrated in FIG. 7, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

1. DL BM Using SSB

FIG. 8 is a flowchart showing an example of a downlink beam management procedure using SSB.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S810).

Table 5 shows an example of CSI-ResourceConfig IE and as shown in Table 5, a BM configuration using the SSB is not separately defined and the SSB is configured like the CSI-RS resource.

TABLE 5

```
-- ASN1START
-- TAG-CSI-RESOURCECONFIG-START
CSI-ResourceConfig ::=            SEQUENCE {
    csi-ResourceConfigId              CSI-ResourceConfigId,
    csi-RS-ResourceSetList            CHOICE {
        nzp-CSI-RS-SSB                    SEQUENCE {
            nzp-CSI-RS-ResourceSetList        SEQUENCE (SIZE
(1..maxNrofNZP-CSI-RS-ResourceSetsPerConfig)) OF NZP-CSI-RS-ResourceSetId
OPTIONAL,
            csi-SSB-ResourceSetList           SEQUENCE (SIZE
(1..maxNrofCSI-SSB-ResourceSetsPerConfig)) OF CSI-SSB-ResourceSetIdOPTIONAL
        ),
        csi-IM-ResourceSetList            SEQUENCE (SIZE (1..maxNrofCSI-IM-
ResourceSetsPerConfig)) OF CSI-IM-ResourceSetId
```

TABLE 5-continued

```
),
  bwp-Id                    BWP-Id,
  resourceType              ENUMERATED { aperiodic, semiPersistent,
periodic ),
  ...
}
-- TAG-CSI-RESOURCECONFIGTOADDMOD-STOP
-- ASN1STOP
```

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S820).

When CSI-RS reportConfig associated with reporting of SSBRI and L1-RSRP is configured, the UE (beam) reports to the eNB best SSBRI and L1-RSRP corresponding thereto (S830).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

2. DL BM Procedure Using CSI-RS

When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through the same Tx beam.

Here, at least one CSI-RS resource in NZP-CSI-RS-ResourceSet may be transmitted to different OFDM symbols or transmitted in different frequency domain (i.e., through FDM).

When the UE is a multi-panel UE, at least one CSI-RS resource is a target of FDM.

In addition, when the repetition is configured to "ON", it is related to the Rx beam sweeping procedure of the UE.

The UE does not expect that different periodicities are received at periodicityAndOffset in all CSI-RS resources in NZP-CSI-RS-Resourceset.

In addition, when repetition is configured to 'OFF', the UE does not assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through different Tx beams.

When the repetition is configured to "OFF", it is related to the Tx beam sweeping procedure of the eNB.

In addition, the repetition parameter may be configured only for CSI-RS resource sets associated with CSI-ReportConfig having a report of L1 RSRP or 'No Report (or None)'.

When the UE is configured with CSI-ReportConfig in which reportQuantity is configured as cri-RSRP' or 'none', the UE may be configured only with the same number of port (1-port or 2-port) having higher layer parameter 'nrof-Ports' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition"(=ON).

More specifically, with respect to the purpose of the CSI-RS, if parameter repetition is configured and TRS_info is not configured in a specific CSI-RS resourceset, the CSI-RS is used for beam management.

In addition, if parameter repetition is not configured and TRS_info is configured, the CSI-RS is used as a TRS (Tracking Reference Signal).

In addition, if neither parameter repetition nor TRS_info is configured, the CSI-RS is used for CSI acquisition.

FIG. 9 illustrates an example of a downlink beam management procedure using a Channel State Information-Reference Signal (CSI-RS).

(a) of FIG. 9 illustrates an Rx beam determination (or refinement) procedure of the UE and (b) of FIG. 9 illustrates a Tx beam sweeping procedure of the eNB. Further, (b) of FIG. 9 illustrates a case where the repetition parameter is configured to 'ON' and (b) of FIG. 9 illustrates a case where the repetition parameter is configured to 'OFF'.

Referring to (a) of FIG. 9 and FIG. 10, an Rx beam determination process of the UE will be described.

FIG. 10 is a flowchart showing an example of a RX beam determination process of a UE in the DL BM procedure using CSI-RS.

In the FIG. 10, the UE receives, from the eNB, NZP CSI-RS resource set IE including higher layer parameter repetition through RRC signaling (S1010). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1020).

The UE determines the Rx beam thereof (S1030).

The UE may skip a CSI report and transmit a CSI report including CRI/L1-RSRP to the eNB (S1040).

In this case, reportQuantity of CSI report config may be configured as "No report (or None)" or CRI and L1-RSRP''.

That is, when repetition is configured to "ON", the UE may skip the CSI report or report ID information (CRI) of a beam pair related priority beam and a quality value (L1-RSRP) thereof.

Referring to (b) of FIG. 9 and FIG. 11, a Tx beam determination process of the eNB will be described.

FIG. 11 is a flowchart showing an example of a TX beam determination process of an eNB.

The UE receives, from the eNB, NZP CSI-RS resource set IE including higher layer parameter repetition through RRC signaling (S1110).

Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1120).

The UE selects (or determines) a best beam (S1130), and reports to the eNB an ID for the selected beam and related quality information (e.g., L1-RSRP) (S1140).

In this case, reportQuantity of CSI report config may be configured as 'CRI+L1-RSRP'. In other words, when the CSI-RS is transmitted for the BM, the UE reports to the eNB the CRI and L1-RSRP therefor.

FIG. 12 illustrates an example of resource allocation in time and frequency domains associated with an operation of FIG. 9.

Referring to FIG. 12, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

3. DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

4. QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not

TABLE 6

```
-- ASN1START
-- TAG-TCI-STATE-START
TCI-State ::=                SEQUENCE {
    tci-StateId                 TCI-StateId,
    qcl-Type1                   QCL-Info,
    qcl-Type2                   QCL-Info
    ...
}
QCL-Info ::=                SEQUENCE {
    cell                        ServCellIndex
    bwp-Id                      BWP-Id
    referenceSignal             CHOICE {
        csi-rs                      NZP-CSI-RS-ResourceId,
        ssb                         SSB-Index
    },
    qcl-Type                    ENUMERATED {typeA, typeB, typeC, typeD},
    ...
}
-- TAG-TOT-STATE-STOP
-- ASN1STOP
```

In Table 6, bwp-Id parameter represents DL BWP in which the RS is located, cell parameter represents a carrier in which the RS is located, and reference signal parameter the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart from DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

Hereafter, downlink transmission/reception operation will be described.

FIG. 13 illustrates an example of downlink transmission/reception operation.

A base station may schedule downlink transmission such as frequency/time resources, a transport layer, a downlink precoder, MCS, and the like (S1310). As an example, the base station may determine a beam for transmitting a PDSCH to a UE.

The UE may receive downlink control information (DCI: Downlink Control Information) for downlink scheduling (i.e., including scheduling information of the PDSCH) on a PDCCH from the base station (S1320).

DCI format 1_0 or DCI format 1_1 may be used for downlink scheduling, and DCI format 1_1 may include the following information. For example, DCI format 1_1 may include at least one of a DCI format identifier, a bandwidth part indicator, frequency domain resource assignment, time domain resource assignment, a PRB bundling size indicator, a rate matching indicator, ZP CSI-RS trigger, antenna port(s), transmission configuration indication (TCI), an SRS request, and demodulation reference signal (DMRS) sequence initialization.

In particular, the number of DMRS ports can be scheduled, and SU (single-user)/MU (multi-user) transmission scheduling can be performed according to each state indicated in the antenna port(s) field.

In addition, the TCI field consists of 3 bits, and the QCL for the DMRS may be dynamically indicated by indicating a maximum of 8 TCI states according to the TCI field value.

The UE may receive downlink data from the base station on the PDSCH (S1330).

When the UE detects a PDCCH including DCI format 1_0 or 1_1, the UE may decode the PDSCH according to an indication by the corresponding DCI. Here, when the UE receives a PDSCH scheduled by DCI format 1, the UE may set a DMRS configuration type by a higher layer parameter 'dmrs-Type', and the DMRS type is used to receive the PDSCH. In addition, the UE may set the maximum number of DMRS symbols front-loaded for the PDSCH by a higher layer parameter 'maxLength'.

In the case of DMRS configuration type 1, when a single codeword is scheduled for the UE and an antenna port mapped with an index of {2, 9, 10, 11 or 30} is specified, or two codewords are scheduled for the UE, the UE assumes that all remaining orthogonal antenna ports are not associated with PDSCH transmission to another UE. In the case of DMRS configuration type 2, if a single codeword is scheduled for the UE and an antenna port mapped with an index of {2, 10 or 23} is specified, or if two codewords are scheduled for the UE, the UE assumes that all the remaining orthogonal antenna ports are not associated with PDSCH transmission to another UE.

When the UE receives the PDSCH, it may assume precoding granularity P' to be consecutive resource blocks in the frequency domain. Here, P' may correspond to one of {2, 4, broadband}. If P' is determined to be wideband, the UE does not expect to be scheduled with non-contiguous PRBs and the UE may assume that the same precoding is applied to allocated resources. On the other hand, if P' is determined as any one of {2, 4}, a precoding resource block group (PRG) is divided into P' consecutive PRBs. The actual number of consecutive PRBs in each PRG may be one or more. The UE may assume that the same precoding is applied to consecutive downlink PRBs in the PRG.

In order for the UE to determine a modulation order, a target code rate, and a transport block size in the PDSCH, the UE may first read a 5-bit MCD field in the DCI and determine the modulation order and the target code rate. Then, the UE may read a redundancy version field in the DCI and determine a redundancy version. In addition, the UE may determine the transport block size using the number of layers and the total number of allocated PRBs before rate matching.

Multi-Transmission/Reception Point (TRP) Related Operation

A technique of Coordinated Multi Point (CoMP) refers to a scheme of effectively controlling interference multiple BS exchanges or utilizes channel information (e.g., RI/CQI/PMI/LI, etc.) fed back from the UE (e.g., uses the X2 interface) or transmits the channel information in coordination with the UE. According to a scheme using the channel information fed back from the UE, types of CoMP may be classified into Joint transmission (JT), Coordinated scheduling (CS), Coordinated beamforming (CB), dynamic point selection (DPS), dynamic point blanking (DPB), etc.

M-TRP (Multiple TRP) Transmission

An M-TRP transmission scheme in which M TRPs transmit data to one user equipment (UE) may be largely divided into two types, eMBB M-TRP transmission which is a scheme for increasing a transmission rate and URLLC M-TRP transmission which is a scheme for increasing a reception success rate and reducing latency.

Further, in terms of downlink control information (DCI) transmission, the multiple (M)-TRP transmission scheme may be divided into i) a multiple (M)-DCI based M-TRP transmission scheme in which each TRP transmits different DCI and ii) a single (S)-DCI based M-TRP transmission scheme in which one TRP transmits the DCI. As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

In TDM based URLLC, standardization for scheme ¾ is being discussed. Specifically, scheme 4 means a scheme in which one TRP transmits the TB in one slot and has an effect of increasing a data reception probability through the same TB received from multiple TRPs in multiple slots. Unlike this, scheme 3 means a scheme in which one TRP transmits the TB through several consecutive OFDM symbols (i.e., symbol group), and may be configured in such a manner that multiple TRPs transmit the same TB through different symbol groups in one slot.

Further, the UE may recognize PUSCH (or PUCCH) scheduled by DCI received by different CORESETs (or CORESETs which belong to different CORESET groups) as PUSCH (or PUCCH) transmitted to different TRPs or PUSCH (or PUCCH) of different TRPs. Further, a scheme for UL transmission (e.g., PUSCH/PUCCH) transmitted to different TRPs may be applied equally even to UL transmission (e.g., PUSCH/PUCCH) transmitted to different panels which belong to the same TRP.

Further, MTRP-URLLC may mean that M TRPs transmit the same transport block (TB) by using different layers/times/frequencies. It may be assumed that a UE which is configured with an MTRP-URLLC transmission scheme is indicated with multiple TCI state(s) through the DCI and data received by using a QCL RS of each TCI state are the same TB. On the contrary, MTRP-eMBB may mean that M TRPs transmit different TBs by using different layers/times/frequencies. It may be assumed that a UE which is configured with an MTRP-eMBB transmission scheme is indicated with multiple TCI state(s) through the DCI and the data received by using the QCL RS of each TCI state are different TBs. In this regard, as the UE separately uses an RNTI configured for a purpose of MTRP-URLLC and an RNTI configured for a purpose of MTRP-eMBB, the UE may determine/decide whether the corresponding M-TRP transmission, URLLC transmission or eMBB transmission. That is, when CRC masking of the DCI received by the UE is performed by using the RNTI configured for the purpose of the MTRP-URLLC, this may correspond to the URLLC transmission and when the CRC masking of the DCI is performed by using the RNTI configured for the purpose of the MTRP-URLLC, this may correspond to the eMBB transmission.

Description of Multiple DCI Based NCJT/Single DCI Based NCJT

Non-coherent joint transmission (NCJT) is a method in which multiple transmission points (TPs) transmit data to one user equipment (UE) by using the same time frequency, and the TPs mutually transmit the data to different layers by using different Demodulation Multiplexing Reference Signal (DMRS) ports. The TP delivers data scheduling information to a UE that performs NCJT reception through downlink control information (DCI), and in this case, a scheme in which each TP which participates in the NCJT delivers scheduling information data transmitted thereby through the DCI is referred to as multi DCI based NCJT. Since each of N TPs which particulate NCJT transmission transmits, to the UE, DL grant DCI and PDSCH, the UE receives, from N TPs, N DCIs and N PDSCHs.

Unlike this, a scheme in which one representative TP delivers scheduling information for data transmitted thereby and data transmitted by another TP through one DCI is referred to as single DCI based NCJT. In this case, N TPs transmit one PDSCH, but each TP transmits only some layers of multiple layers constituting one PDSCH. For example, when 4-layer data is transmitted, TP 1 transmits 2 layers and TP 2 transmits, to the UE, 2 remaining layers.

Description of Partially Overlapped NCJT

Further, the NCJT is divided into fully overlapped NCJT in which time frequency resources transmitted by respective TPs are fully overlapped and partially overlapped NCJT in which only some time frequency resources are overlapped. That is, in the case of the partially overlapped NCJT, both transmission data of TP 1 and TP 2 are transmitted in some time frequency resources, and only one TP of TP 1 or TP 2 transmits data in the remaining time frequency resources.

Reliability Enhancement Scheme in Multi-TRP

As a transmission/reception method for reliability enhancement using transmission in multiple TRPs, two following methods may be considered.

FIG. 14 illustrates an example of a transmission/reception method for reliability enhancement using transmission in multiple TRPs.

The example of (a) of FIG. 14 illustrates a case where layer groups transmitting the same codeword (CW)/TB correspond to different TRPs. In this case, the layer group may mean a certain layer set constituted by one layer or one or more layers. In this case, there is an advantage in that a quantity of transmission resources increases due to multiple layers and robust channel coding robust of a low coding rate may be used for the transport block (TB) through the increased transmission resource quantity and further, since channels from multiple TRPs are different, reliability enhancement of a received signal may be expected based on a diversity gain.

Meanwhile, the example of (b) of FIG. 14 illustrates an example of transmitting different CWs through layer groups corresponding to different TRPs. In this case, it may be assumed that TBs corresponding to CW #1 and CW #2 of the figure are the same as each other. Accordingly, the example may be regarded as an example of repeated transmission of the same TB. The case of (b) of FIG. 14 may have a disadvantage that the coding rate corresponding to the TB is high as compared with the case of (a) of FIG. 14. However, there is an advantage in that the coding rate may be adjusted by indicating different redundancy version (RV) values for encoding bits generated from the same TB according to a channel environment or a modulation order of each CW may be controlled.

In (a) of FIG. 14/(b) of FIG. 14 above, as the same TB is repeatedly transmitted through different layer groups and different TRPs/panels transmit each layer group, a data reception probability may be increased and this is referred to as an SDM based M-TRP URLLC transmission scheme. Layers which belong to different layer groups are transmitted through DMRS ports which belong to different DMRS CDM groups, respectively.

Further, the above-described contents related to multiple TRPs are described based on a spatial division multiplexing (SDM) scheme using different layers, but this may be, of course, extensively applied even to a frequency division multiplexing (FDM) scheme based on different frequency domain resources (e.g., RB/PRB (set) and/or a time division multiplexing (TDM) scheme based on different time domain resources (e.g., slot, symbol, sub-symbol).

Hereafter, discussed contents related to Multi-TRP is described.

Schemes for multi-TRP based URLLC, scheduled by single DCI at least, are clarified as following.

Scheme 1 (SDM): n (n<=Ns) TCI states within the single slot, with overlapped time and frequency resource allocation Scheme 1a: Each transmission occasion is a layer or a set of layers of the same TB, with each layer or layer set is associated with one TCI and one set of DMRS port(s). Single codeword with one RV is used across all spatial layers or layer sets. From the UE perspective, different coded bits are mapped to different layers or layer sets with the same mapping rule as in Rel-15.

Scheme 1b: Each transmission occasion is a layer or a set of layers of the same TB, with each layer or layer set is associated with one TCI and one set of DMRS port(s). Single codeword with one RV is used for each spatial layer or layer set. The RVs corresponding to each spatial layer or layer set can be the same or different.

Scheme 1c: One transmission occasion is one layer of the same TB with one DMRS port associated with multiple TCI state indices, or one layer of the same TB with multiple DMRS ports associated with multiple TCI state indices one by one.

For Scheme 1a and 1c, the same MCS is applied for all layers or layer sets.

In the case of Scheme 1b, the same or different MCS/modulation order may be discussed for different layers or layer sets.

Scheme 2 (FDM): n (n<=Ns) TCI states within the single slot, with non-overlapped frequency resource allocation Each non-overlapped frequency resource allocation is associated with one TCI state.

Same single/multiple DMRS port(s) are associated with all non-overlapped frequency resource allocations.

Scheme 2a: Single codeword with one RV is used across full resource allocation. From UE perspective, the common RB mapping (codeword to layer mapping) is applied across full resource allocation.

Scheme 2b: Single codeword with one RV is used for each non-overlapped frequency resource allocation. The RVs corresponding to each non-overlapped frequency resource allocation can be the same or different.

For scheme 2a, same MCS is applied for all non-overlapped frequency resource allocations.

In the case of Scheme 2b, the same or different MCS/modulation order may be discussed for different non-overlapping frequency resource allocation.

Details of a frequency resource allocation mechanism for FDM 2a/2b related to allocation granularity and time domain allocation may be discussed.

Scheme 3 (TDM): n (n<=Nt1) TCI states within the single slot, with non-overlapped time resource allocation Each transmission occasion of the TB has one TCI and one RV with the time granularity of mini-slot.

All transmission occasion (s) within the slot use a common MCS with same single or multiple DMRS port(s).

RV/TCI state can be same or different among transmission occasions.

Scheme 4 (TDM): n (n<=Nt2) TCI states with K (n<=K) different slots.

Each transmission occasion of the TB has one TCI and one RV.

All transmission occasion (s) across K slots use a common MCS with same single or multiple DMRS port(s).

RV/TCI state can be same or different among transmission occasions.

M-TRP/panel based URLLC schemes should be compared in terms of improved reliability, efficiency, and specific impact. For reference, supporting a layer number per TRP may be discussed.

A TCI indication framework should be at least strengthened in Rel-16 for eMBB.

Each TCI codepoint of the DCI may correspond to one or two TCI states. When two TCI states are activated within the TCI codepoint, each TCI state at least corresponds to one CDM group for DMRS type 1.

In the TRP related description in the disclosure, the TRP may be replaced with a base station, a transmission point (TP), a cell (e.g., macro cell/small cell/pico cell), an antenna array, or a panel, and appreciated.

The foregoing description may be combined with the methods described below according to the disclosure or may be provided to specify or clarify the technical features of the methods proposed herein. Further, the embodiments and/or methods described in the disclosure are differentiated solely for ease of description, and some components in any one method may be replaced, or combined with components of another method.

In the disclosure, a method for a base station to indicate a reception beam of a UE and a subsequent operation of determining a reception beam of the UE are described. Specifically, in Rel-15, a transmission configuration indicator (TCI) state may be used in order for the base station to indicate to the UE a reception beam (i.e., spatial Rx parameter) to be used when receiving the PDCCH and the PDSCH. It is possible to indicate to use the reception beam when receiving the DL RS configured as a reference upon reception of the PDCCH or PDSCH by configuring a downlink reference signal (e.g., SSB-RI or CRI (P/SP/AP)) as a reference RS or source RS of the QCL Type-D component through the TCI state.

In the disclosure, a method for indicating the reception beam of the UE by the base station when an uplink channel (e.g., SRS) is configured as a reference RS of the QCL Type-D component in such a transmission configuration indicator (TCI) state is described, and a subsequent UE reception beam determination operation is described.

In Rel-15 NR, a beam for the UE's PUSCH transmission may be indicated through the configuration of the SRI field of the UL DCI as described above for beam management. The procedure may be described for the case where beam correspondence is established and the case where no beam correspondence is established.

When no beam correspondence is established, the following procedure is performed.

1) An uplink (UL) beam management operation is performed for finding the optimal UL analog beam by using multiple resources of an SRS resource set whose usage is 'BM.'

2) As a result of the uplink beam management (UL BM), a resource(s) determined as the optimal UL analog beam is linked to the spatial relation information (e.g., SRS-SpatialRelationInfo) of the resources belonging to the SRS resource set whose usage is codebook (CB)' or 'non-codebook (non-CB).' The UE transmits the SRS whose usage is 'CB' or 'non-CB' through the corresponding analog beam and may be expected to be indicated for link adaptation and modulation and coding scheme (MCS)/rank indicator (RI)/transmission precoding matrix indicator (TPMI).

3) Finally, a candidate for a PUSCH beam indication may be configured based on an SRI field. Specifically, the candidate may be configured through RRC with resources belonging to the SRS resource set which is 'CB' or 'non-CB' based on one or two SRS resource indicators (SRIs).

As described above, the PUSCH beam indication may be performed based on an indication of the SRI field of the UL DCI for PUSCH scheduling. For the resource belonging to the SRS resource set which is 'CB' or 'non-CB' configured in the SRI field to be effective for PUSCH beam indication, the resource belonging to the SRS resource set which is 'CB' or 'non-CB' should be transmitted through SRS at least one time or more before the UL DCI including the SRI indication.

When beam correspondence is established, the uplink beam management (UL BM) operation is omitted. A UL analog beam corresponding to a downlink (DL) beam may be configured through the SRI field by configuring a DL RS ID (CSI-RI/SSB-RI) in the spatial relation information (e.g., SRS-SpatialRelationInfo) of the SRS resource set whose usage is 'CB' or 'non-CB.' Even in this case, the resource belonging to the SRS resource set which is 'CB' or 'non-CB' should be transmitted through SRS at least one time or more before the UL DCI including the SRI indication.

As described above, the TCI state is used to configure/indicate the reception beam (i.e., spatial Rx parameter) to be used when the base station receives PDCCH and PDSCH from the UE (more precisely, when receiving the DMRS of PDCCH and PDSCH) using the concept of quasi co-located (QCL) adopted in (Rel-15) NR. A downlink reference signal (e.g., SSB-RI, CRI (P/SP/AP)) may be configured as a reference RS or a source RS of the QCL Type-D component through the corresponding TCI state. The base station may instruct the UE to use the reception beam when receiving the DL RS configured as a reference when receiving the PDCCH or PDSCH.

In the disclosure, proposed is a method for increasing the flexibility of the spatial relation configuration/association of the base station and reducing latency in the manner to directly use the UL RS by considering a method of configuring UL RS(s)/channel(s) (e.g., SRS) as the reference RS of QCL Type-D component in configuring/indicating the TCI state.

Hereinafter, a method for a base station to indicate a reception beam of a UE as proposed in the disclosure is described, and a subsequent operation of determining a reception beam of the UE are described. In other words, described below in detail are a method for configuration between base station and UE for the case of configuring UL RS(s)/channel(s) (e.g., SRS) as the reference RS of the QCL Type-D component in the TCI state for indicating the reception beam of PDCCH and PDSCH by the base station and a subsequent UE reception beam determination operation related thereto (hereinafter, proposals 1/2/3). As mentioned above, the reception beam to be used upon receiving PDCCH/PDSCH in the disclosure may be interpreted/applied as the reception beam to be used upon receiving the DMRS of PDCCH/PDSCH.

[Proposal 1]

The base station may configure an uplink reference signal/channel as the reference RS of the QCL Type-D component in the TCI state for indicating the reception beam of a specific downlink (reference) signal/channel to the UE.

Specifically, the base station may configure the UL RS(s)/channel(s) (e.g., SRS, SRS resource indicator) as the reference RS of the QCL Type-D component in the TCI state for indicating the reception beam of the DL RS(s)/channel(s) (e.g., PDCCH (DMRS), PDSCH (DMRS), or CSI-RS for CSI acquisition) to the UE.

The UE may receive the DL RS(s)/channel(s) based on the spatial Rx parameter (or spatial domain Rx filter or reception beam) corresponding to the spatial Tx parameter (or spatial domain Tx filter or transmission (Tx) beam) used upon transmission of the UL RS(s)/channel(s) configured before (i.e., in the past).

As an example, the UE may operate as follows. The UE may receive the target downlink reference signal (DL RS)/channel (e.g., PDCCH (DMRS), PDSCH (DMRS), or CSI-RS for CSI acquisition) through spatial domain (receive) filter corresponding to the used spatial domain (transmission) filter for the transmission of the reference SRS.

For example, if an SRS (or SRI) is configured as the reference RS of the QCL Type-D component in the TCI state, upon reception of the target DL RS/channel, the UE may receive the target DL RS/channel through the reception beam corresponding to the transmission beam of the spatial relation used upon transmission of the SRS in receiving the target DL RS/channel.

The above-described operation differs from the operation when a DL RS is configured as the reference RS of the QCL Type-D component in the TCI state as conventional. In the conventional operation, the UE reuses/applies the spatial Rx parameter (or spatial domain Rx filter or Rx beam) used when receiving the DL RS configured as the reference RS in the past.

As in proposal 1, it is possible to enhance flexibility in the operation related to the spatial relation configuration/association of the base station and reduce latency by directly using the uplink reference signal (UL RS) as the reference RS of the QCL Type-D component in the DL TCI state.

[Proposal 2]

A specific RS, that is, an SRS (e.g., periodic SRS/semi-persistent SRS/aperiodic SRS) may be configured as the reference RS of the QCL Type-D component in the TCI state. As an example, the case in which the SRS is configured as the reference RS of the QCL Type-D component in the TCI state may be shown in Table 7 below.

TABLE 7

```
TCI-State ::=            SEQUENCE {
   tci-StateId              TCI-StateId,
   qcl-Type1                QCL-Info,
   qcl-Type2                QCL-Info
   ...
}
QCL-Info ::=             SEQUENCE {
   cell                     ServCellIndex
   bwp-Id                   BWP-Id
   referenceSignal          CHOICE {
      csi-rs                    NZP-CSI-RS-ResourceId,
      ssb                       SSB-Index
      srs                       SRS resource ID
   },
```

TABLE 7-continued

| qcl-Type | ENUMERATE {typeA, typeB, typeC, typeD}, ... } |
|---|---|

As described above, when the SRS is configured as the reference RS of the QCL Type-D component in the TCI state, the operation between the base station and the UE considering the operation aspect of the SRS in the time domain may be performed based on at least one of proposals 2-1/2-2/2-3 below.

[Proposal 2-1] Periodic SRS

A periodic SRS (P-SRS) may be configured as the reference RS of the TCI state.

Specifically, when the periodic SRS (P-SRS) is configured as the reference RS of the QCL Type-D component in the TCI state, the reception beam corresponding to the transmission beam of the P-SRS most recently transmitted may be used as the reception beam (or spatial Rx parameter or spatial domain Rx filter) for receiving the target DL RS/channel.

According to an embodiment, the above-described operation may be limited as applied only when the P-SRS configured as the reference RS is transmitted through RRC.

According to an embodiment, the above-described operation may be limited as applied only to the P-SRS transmitted within T (slot/ms/symbol) from the time of reception of target RS/channel (or the time set/indicated by the reference RS of the TCI state). In other words, the P-SRS transmitted a predetermined time before the target RS/channel reception time (or the time set/indicated by the reference RS of the TCI state) (e.g., the P-SRS transmitted in time duration based on T) may be configured as the reference RS.

[Proposal 2-2] Semi-Persistent SRS

A semi-persistent SRS (SP-SRS) may be configured as the reference RS of the TCI state.

When the semi-persistent SRS (SP-SRS) is configured as the reference RS of the QCL Type-D component in the TCI state, the reception beam corresponding to the transmission beam of the SP-SRS most recently transmitted may be used as the reception beam (or spatial Rx parameter or spatial domain Rx filter) for receiving the target DL RS/channel.

According to an embodiment, the above-described operation may be limited as applied only when the SP-SRS configured as the reference RS is transmitted through RRC and then activated through MAC-CE.

According to an embodiment, the above-described operation may be limited as applied only to the SP-SRS transmitted within T (slot/ms/symbol) from the time of reception of target RS/channel (or the time set/indicated by the reference RS of the TCI state). In other words, the SP-SRS transmitted a predetermined time before the target RS/channel reception time (or the time set/indicated by the reference RS of the TCI state) (e.g., the SP-SRS transmitted in time duration based on T) may be configured as the reference RS.

[Proposal 2-3] Aperiodic SRS

An aperiodic SRS (AP-SRS) may be configured as the reference RS of the TCI state.

When the aperiodic SRS (AP-SRS) is configured as the reference RS of the QCL Type-D component in the TCI state, the reception beam (or spatial Rx parameter or spatial domain Rx filter) corresponding to the transmission beam of the AP-SRS most recently triggered and transmitted by the base station may be used as the reception beam for receiving the target DL RS/channel.

According to an embodiment, the above-described operation may be limited as applied only to the AP-SRS transmitted within T (slot/ms/symbol) from the time of reception of target RS/channel (or the time set/indicated by the reference RS of the TCI state). In other words, the AP-SRS transmitted a predetermined time before the target RS/channel reception time (or the time set/indicated by the reference RS of the TCI state) (e.g., the AP-SRS transmitted in time duration based on T) may be configured as the reference RS.

Further, the application range of the "most recent" mentioned in the above-mentioned proposals 2-1/2-2/2-3 may be set/defined as time duration from the TCI state set/indication time to k (k>=0) (slot/ms/symbol) before, considering uplink beam weight calculation and configuration time. For example, if k=4, when the TCI state configuration/indication time is n, the transmission beam of the most recently (P/SP/AP) SRS generated before the time of n−4 may be selected as the reception beam when receiving the target DL RS/channel. k may be set/indicated by the base station to the UE. Alternatively, k may be reported as UE capability according to the computing capability of each UE, and the base station may set/indicate k based on the report.

According to proposal 2 above, the reception beam corresponding to the SRS transmission beam recently configured/activated/indicated by the base station may be configured as the reception beam of the UE upon reception of the target DL RS/channel. Operational ambiguity related to the reception beam indication of the downlink signal/channel may be removed, and the corresponding reception beam indication may be performed considering the capability of the UE.

[Proposal 3]

Based on the above-mentioned proposal 1/proposal 2, a new QCL type for a reference RS of the configured TCI state may be defined.

Specifically, when the base station configures UL RS(s)/channel(s) as the reference RS of DL RS(s)/channel(s), the base station may operate as follows. The base station may configure the UL RS(s)/channel(s) to be referenced based on a QCL type separate from the QCL types (e.g., QCL Type-A, B, C, and D) existing in the TCI state. In this case, the QCL type may be based on QCL Type-E, a new spatial relation, or a separate component.

As described in proposal 1, the operation for the case of configuring the existing DL RS as the reference RS of the QCL Type-D component in the TCI state and the operation for the case of configuring the UL RS/channel as the reference RS in the disclosure have different characteristics. Thus, a method for configuring/indicating a reference RS in the form of a specific type or new spatial relation separately from QCL Type-D may be considered. As an example, as in proposal 1/2, an uplink channel (e.g., (P/SP/AP)SRS) may be configured/indicated as the reference RS of the new spatial relation component or QCL Type-E to be applied to the target RS/channel in the TCI state.

In terms of implementation, operations (e.g., operations related to transmission of a downlink signal based on at least one of proposals 1/2/2-1/2-2/2-3/3) of the base station/UE according to the above-described embodiments may be processed by the device (e.g., the processors 102 and 202 of FIG. 23) of FIGS. 22 to 26 described below.

Further, operations (e.g., operations related to transmission of a downlink signal based on at least one of proposals 1/2/2-1/2-2/2-3/3) of the base station/UE according to the above-described embodiment may be stored in the memory (e.g., 104 or 204 of FIG. 23), in the form of a command/ program (e.g., instruction or executable code) for driving at least one processor (e.g., 102 or 202 of FIG. 23).

Hereinafter, a UE-to-base station signaling procedure based on at least one of the above-described proposals 1/2/2-1/2-2/2-3/3 is described in detail with reference to FIGS. 15 to 19. FIG. 15 and FIG. 16 are a procedure related to multiple TRPs. FIG. 17 is a procedure related to PDCCH, FIG. 18 is a procedure related to PDSCH, and FIG. 19 is a procedure related to CSI-RS. These are described one by one below.

FIGS. 15 and 16 illustrate signaling between the network side (e.g., TRP1 or TRP2) and the UE in the circumstance of multiple TRPs (i.e., M-TRP or multiple cells, hereinafter all TRPs may be replaced with cells) to which the methods (e.g., proposals 1/2/2-1/2-2/2-3/3) proposed in the disclosure may be applied (refer to multi-TRP-related content).

Referring to FIGS. 15 and 16, although signaling between two TRPs and the UE is considered for ease of description, the signaling scheme may be applied to signaling between multiple TRPs and multiple UEs. In the following description, network side may be one base station including a plurality of TRPs or may be a single cell including a plurality of TRPs. As an example, an ideal/non-ideal backhaul may be established between TRP1 and TRP2 constituting the network side. Although the following description is made based on multiple TRPs, this may also be applied to transmission through multiple panels. Further, the operation of receiving a signal by the UE from TRP1/TRP2 in the disclosure may be interpreted/described as (or may be) the operation of receiving a signal by the UE from the network side (through/using TRP 1/2), and the operation of transmitting a signal by the UE to TRP1/TRP2 may be interpreted/described as (or may be) the operation of transmitting a signal by the UE to the network side (through/using TRP1/TRP2), and vice versa.

FIG. 15 is a flowchart for describing an example of a signaling procedure between a network side and a UE to which methods proposed in the disclosure may be applied.

Specifically, FIG. 15 illustrates signaling for the case where the UE receives multiple DCI (i.e., the case where the network side transmits DCI to the UE through/using each TRP) in the circumstance of M-TRP (or cells, hereinafter TRP may be replaced with cell/panel, or even when a plurality of coresets are configured by one TRP, it may be assumed as M-TRP).

The UE may receive configuration information for multiple TRP-based transmission/reception through/using TRP 1 (and/or TRP 2) from the network side (S1505). The configuration information may include, e.g., information related to the configuration (i.e., TRP configuration) of the network side and multiple TRP-based transmission/reception-related resource information (resource allocation). In this case, the configuration information may be transferred through higher layer signaling (e.g., RRC signaling or MAC-CE). Further, if the configuration information is previously defined or configured, the step may be omitted. For example, the configuration information may include a configuration related to the above-described methods (e.g., proposals 1/2/2-1/2-2/2-3/3).

Hereinafter, the UE may receive DCI 1 and Data 1 scheduled by DCI 1 through/using TRP 1 from the network side (S1510-1). Further, the UE may receive DCI 2 and Data 2 scheduled by DCI 2 through/using TRP 2 from the network side (S1510-2). For example, DCI 1 and DCI 2 may be based on the TCI state described in the above-described methods (e.g., proposals 1/2/2-1/2-2/2-3/3).

Further, each DCI (e.g., DCI 1, DCI 2) and data (e.g., Data 1, Data 2) may be transferred through a control channel (e.g., PDCCH, etc.) and a data channel (e.g., PDSCH, etc.). Further, steps S1510-1 and S1510-2 may be performed simultaneously or one thereof may be performed earlier than the other.

Thereafter, the UE may decode Data 1 and Data 2 received from TRP 1 and TRP 2 (S1515). For example, the UE may perform channel estimation and/or data decoding based on the above-described methods (e.g., proposals 1/2/2-1/2-2/2-3/3).

Thereafter, the UE may transmit HARQ-ACK information (e.g., ACK information, NACK information, etc.) for Data 1 and/or Data 2 to the network side through/using TRP 1 and/or TRP 2 (S1520-1 and S1520-2). In this case, HARQ-ACK information for Data 1 and Data 2 may be combined into one. Further, the UE may be configured to transmit only HARQ-ACK information to a representative TRP (e.g., TRP 1) and transmission of HARQ-ACK information to the other TRP (e.g., TRP 2) may be omitted.

FIG. 16 is a flowchart for describing another example of a signaling procedure between a network side and a UE to which methods proposed in the disclosure may be applied.

Specifically, FIG. 16 illustrates signaling for the case where the UE receives single DCI (i.e., the case where the network side transmits DCI to the UE through/using one TRP) in the circumstance of M-TRP (or cells, hereinafter TRP may be replaced with cell/panel, or even when a plurality of coresets are configured by one TRP, it may be assumed as M-TRP). In FIG. 16, it is assumed that TRP 1 is a representative TRP for transmitting DCI.

The UE may receive configuration information for multiple TRP-based transmission/reception through/using TRP 1 (and/or TRP 2) from the network side (S1605). The configuration information may include, e.g., information related to the configuration (i.e., TRP configuration) of the network side and multiple TRP-based transmission/reception-related resource information (resource allocation). In this case, the configuration information may be transferred through higher layer signaling (e.g., RRC signaling or MAC-CE). Further, if the configuration information is previously defined or configured, the step may be omitted. For example, the configuration information may include a configuration related to the above-described methods (e.g., proposals 1/2/2-1/2-2/2-3/3).

Hereinafter, the UE may receive DCI and Data 1 scheduled by DCI through/using TRP 1 from the network side (S1610-1). Further, the UE may receive Data 2 from TRP 2 from the network side (S1610-2). Here, DCI may be configured to be used for scheduling both Data 1 and Data 2. For example, DCI 1 and DCI 2 may be based on the TCI state described in the above-described methods (e.g., proposals 1/2/2-1/2-2/2-3/3).

Further, DCI and data (e.g., Data 1, Data 2) may be transferred through a control channel (e.g., PDCCH, etc.) and a data channel (e.g., PDSCH, etc.). Further, steps S1610-1 and S1610-2 may be performed simultaneously or one thereof may be performed earlier than the other.

Thereafter, the UE may decode Data 1 and Data 2 received through/using TRP 1 and TRP 2 from the Network (S1615). For example, the UE may perform channel estimation and/or data decoding based on the above-described methods (e.g., proposals 1/2/2-1/2-2/2-3/3).

Thereafter, the UE may transmit HARQ-ACK information (e.g., ACK information, NACK information, etc.) for Data 1 and/or Data 2 to TRP 1 and/or TRP 2 (S1620-1, S1620-2). In this case, depending on the number of codewords, HARQ-ACK information for Data 1 and/or Data 2 may be combined into one or separated. Further, the UE may be configured to transmit only HARQ-ACK information to a representative TRP (e.g., TRP 1) and transmission of HARQ-ACK information to the other TRP (e.g., TRP 2) may be omitted.

A procedure(s) described below with reference to FIGS. 17, 18, and/or 19 may be applied in performing configuration/indication/application/use of the TCI state for, e.g., reception/transmission (e.g., S1505/S1510-1, S1510-2/ S1605/S1610-1/S1610-2) of M-TRP-based PDCCH (e.g., DCI) and/or PDSCH (e.g., data) (and/or M-TRP-based CSI-RS reception/transmission) described above in connection with FIGS. 15 and 16. Hereinafter, the BS operation in FIGS. 17, 18 and/or 19 may be interpreted/applied as the operation of the network side/TRP in FIGS. 15 and/or 16.

FIG. 17 is a flowchart illustrating an example of signaling related to transmission/reception of a PDCCH to which methods proposed in the disclosure may be applied.

Specifically, FIG. 17 illustrates an example of signaling between the user equipment (UE) and the base station (BS) for PDCCH reception/transmission based on the proposed methods (e.g., proposals 1/2/2-1/2-2/2-3/3). FIG. 17 is intended merely for illustration purposes but not for limiting the scope of the disclosure. Further, some steps shown in FIG. 17 may be omitted or merged according to situations and/or configurations.

Hereinafter, this is described in detail in light of UE operation.

The UE may receive TCI state-related configuration information (TCI state related Config) from the BS (S1710). In this case, the configuration information may be transferred through higher layer signaling (e.g., RRC signaling) (e.g., Table 7 above).

For example, as in the above-described proposed methods (e.g., proposals 1/2/2-1/2-2/2-3/3), the UE may receive, from the BS, TCI state Configuration (e.g., TCI state addmodlist for PDCCH) for reception of PDCCH. Further, when a TCI state for PDCCH reception is configured, a UL RS (e.g., P-SRS/SP-SRS/AP-SRS) may be used/configured as a reference signal. Further, as described above, the QCL type may be used to indicate/configure a reference resource (and/or signal) in the reception beam (or spatial Rx parameter, spatial, spatial Rx filter) of PDCCH.

The UE may receive PDCCH-related configuration information (PDCCH related Config) from the BS (S1720). In this case, the configuration information may be transferred through higher layer signaling (e.g., RRC signaling). For example, the UE may receive, from the BS, PDCCH reception-related TCI state (e.g., TCI state Config/info per CORE-SET), through RRC signaling, considering application of the above-described proposed methods (e.g., proposals 1/2/2-1/ 2-2/2-3/3).

The UE may receive PDCCH based on the TCI-related configuration/information transferred from the BS in S1710 and S1720 (S1730). For example, when the TCI state, UL SRS is based on the reference RS, the UE may receive PDCCH using the reference RS-related reception beam (or spatial Rx parameter, spatial Rx filter) as in the above-described proposed methods (e.g., proposals 1/2/2-1/2-2/2-3/3).

Hereinafter, this is described in detail in light of BS operation.

The BS may transmit TCI state-related configuration information (TCI state related Config) to the UE (S1710). In this case, the configuration information may be transferred through higher layer signaling (e.g., RRC signaling) (e.g., Table 7 above).

For example, the BS may transmit, to the UE, TCI state Configuration (e.g., TCI state addmodlist for PDCCH) for PDCCH reception of the UE as in the proposed methods (e.g., proposals 1/2/2-1/2-2/2-3/3). Further, when a TCI state for PDCCH reception is configured, a UL RS (e.g., P-SRS/ SP-SRS/AP-SRS) may be used/configured as a reference signal. Further, as described above, the QCL type may be used to indicate/configure a reference resource (and/or signal) in the reception beam (or spatial Rx parameter, spatial, spatial Rx filter) of PDCCH.

The BS may transmit PDCCH-related configuration information (PDCCH related Config) to the UE (S1720). In this case, the configuration information may be transferred through higher layer signaling (e.g., RRC signaling). For example, the BS may transmit, to the UE, PDCCH reception-related TCI state (e.g., TCI state Config/info per CORE-SET), through RRC signaling, considering application of the above-described proposed methods (e.g., proposals 1/2/2-1/ 2-2/2-3/3).

The BS may transmit, to the UE PDCCH based on the TCI-related configuration/information transferred in S1710 and S1720 (S1730). For example, when the TCI state, UL SRS is based on the reference RS, the BS may configure/ instruct the UE to receive PDCCH using the reference RS-related reception beam (or spatial Rx parameter, spatial Rx filter) as in the above-described proposed methods (e.g., proposals 1/2/2-1/2-2/2-3/3).

FIG. 18 is a flowchart illustrating an example of signaling related to transmission/reception of a PDSCH to which methods proposed in the disclosure may be applied.

Specifically, FIG. 18 illustrates an example of signaling between the user equipment (UE) and the base station (BS) for PDSCH reception/transmission based on the proposed methods (e.g., proposals 1/2/2-1/2-2/2-3/3). FIG. 18 is intended merely for illustration purposes but not for limiting the scope of the disclosure. Further, some steps shown in FIG. 18 may be omitted or merged according to situations and/or configurations.

Hereinafter, this is described in detail in light of UE operation.

The UE may receive TCI state-related configuration information (TCI state related Config) from the BS (S1810). In this case, the configuration information may be transferred through higher layer signaling (e.g., RRC signaling) (e.g., Table 7 above).

For example, as in the above-described proposed methods (e.g., proposals 1/2/2-1/2-2/2-3/3), the UE may receive, from the BS, TCI state Configuration (e.g., TCI state addmodlist for PDSCH) for reception of PDSCH. When a TCI state for PDSCH reception is configured, a UL RS (e.g., P-SRS/SP-SRS/AP-SRS) may be used/configured as a reference signal. Further, as described above, the QCL type may be used to indicate/configure a reference resource (and/or signal) in the reception beam (or spatial Rx parameter, spatial, spatial Rx filter) of PDCCH.

The UE may receive PDSCH-related configuration information (PDSCH related Config) from the BS (S1820). As an example, the configuration information related to the PDSCH may be configured considering application of the above-described proposed methods (e.g., proposals 1/2/2-1/ 2-2/2-3/3).

The UE may receive the PDCCH for scheduling the PDSCH from the BS (S1830). In this case, the corresponding PDCCH may be used to transfer/carry DCI for scheduling the PDSCH. For example, the UE may receive, from the BS, DCI including TCI state information/indication related to reception of PDSCH considering application of the above-described proposed methods (e.g., proposals 1/2/2-1/2-2/2-3/3).

The UE may receive PDSCH based on the TCI-related configuration/indication/information transferred from the BS in S1810 and S1820 (S1840). For example, when the TCI state, UL SRS is based on the reference RS, the UE may receive PDSCH using the reference RS-related reception beam (or spatial Rx parameter, spatial Rx filter) as in the above-described proposed methods (e.g., proposals 1/2/2-1/2-2/2-3/3).

Hereinafter, this is described in detail in light of BS operation.

The BS may transmit TCI state-related configuration information (TCI state related Config) to the UE (S1810). In this case, the configuration information may be transferred through higher layer signaling (e.g., RRC signaling) (e.g., Table 7 above).

For example, the BS may transmit TCI state Configuration (e.g., TCI state addmodlist for PDSCH) for reception of PDSCH of the UE to the UE as in the above-described proposed methods (e.g., proposals 1/2/2-1/2-2/2-3/3). When a TCI state for PDSCH reception is configured, a UL RS (e.g., P-SRS/SP-SRS/AP-SRS) may be used/configured as a reference signal. Further, as described above, the QCL type may be used to indicate/configure a reference resource (and/or signal) in the reception beam (or spatial Rx parameter, spatial, spatial Rx filter) of PDCCH.

The BS may transmit PDSCH-related configuration information (PDSCH related Config) to the UE (S1820). As an example, the configuration information related to the PDSCH may be configured considering application of the above-described proposed methods (e.g., proposals 1/2/2-1/2-2/2-3/3).

The BS may transmit the PDCCH for scheduling the PDSCH to the UE (S1830). In this case, the corresponding PDCCH may be used to transfer/carry DCI for scheduling the PDS CH. For example, the BS may transmit, to the UE, DCI including TCI state information/indication related to reception of the PDSCH of the UE, considering application of the above-described proposed methods (e.g., proposals 1/2/2-1/2-2/2-3/3).

The BS may transmit, to the UE, PDSCH based on the TCI-related configuration/indication/information transferred in S1810 and S1830 (S1840). For example, when the TCI state, UL SRS is based on the reference RS, the BS may configure/instruct the UE to receive PDSCH using the reference RS-related reception beam (or spatial Rx parameter, spatial Rx filter) as in the above-described proposed methods (e.g., proposals 1/2/2-1/2-2/2-3/3).

FIG. 19 is a flowchart illustrating an example of signaling related to transmission/reception of CSI-RS to which methods proposed in the disclosure may be applied.

Specifically, FIG. 19 illustrates an example of signaling between the user equipment (UE) and the base station (BS) for CSI-RS reception/transmission based on the proposed methods (e.g., proposals 1/2/2-1/2-2/2-3/3). FIG. 19 is intended merely for illustration purposes but not for limiting the scope of the disclosure. Further, some steps shown in FIG. 19 may be omitted or merged according to situations and/or configurations.

Hereinafter, this is described in detail in light of UE operation.

The UE may receive TCI state-related configuration information (TCI state related Config) from the BS (S1910). In this case, the configuration information may be transferred through higher layer signaling (e.g., RRC signaling) (e.g., Table 7 above).

For example, as in the above-described proposed methods (e.g., proposals 1/2/2-1/2-2/2-3/3), the UE may receive, from the BS, TCI state Configuration (e.g., CSI-RS resource config, CSI reporting config) for reception of CSI-RS. When a TCI state for CSI-RS reception is configured, a UL RS (e.g., P-SRS/SP-SRS/AP-SRS) may be used/configured as a reference signal. Further, as described above, the QCL type may be used to indicate/configure a reference resource (and/or signal) in the reception beam (or spatial Rx parameter, spatial, spatial Rx filter) of CSI-RS.

The UE may receive CSI-related configuration information (CSI related Config) from the BS (S1920). In this case, the configuration information may be transferred through higher layer signaling (e.g., RRC signaling). For example, the UE may receive, from the BS, TCI state configuration/information related to reception of the CSI-RS of the UE, considering application of the above-described proposed methods (e.g., proposals 1/2/2-1/2-2/2-3/3). Here, the CSI-RS may be a CSI-RS for CSI acquisition and/or a CSI-RS for beam management.

The UE may receive, from the BS, the CSI-RS based on the TCI-related configuration/information transferred in S1910 and S1920 (S1930). For example, when the TCI state, the UL SRS is based on the reference RS, the UE may receive the CSI-RS using the reference RS-related reception beam (or spatial Rx parameter, spatial Rx filter) as in the above-described proposed methods (e.g., proposals 1/2/2-1/2-2/2-3/3).

Hereinafter, this is described in detail in light of BS operation.

The BS may transmit TCI state-related configuration information (TCI state related Config) to the UE (S1910). In this case, the configuration information may be transferred through higher layer signaling (e.g., RRC signaling) (e.g., Table 7 above).

For example, as in the above-described proposed methods (e.g., proposals 1/2/2-1/2-2/2-3/3), the BS may transmit, to the UE, TCI state Configuration (e.g., CSI-RS resource config, CSI reporting config) for reception of CSI-RS of the UE. When a TCI state for CSI-RS reception is configured, a UL RS (e.g., P-SRS/SP-SRS/AP-SRS) may be used/configured as a reference signal. Further, as described above, the QCL type may be used to indicate/configure a reference resource (and/or signal) in the reception beam (or spatial Rx parameter, spatial, spatial Rx filter) of CSI-RS.

The BS may transmit CSI-related configuration information (CSI related Config) to the UE (S1920). In this case, the configuration information may be transferred through higher layer signaling (e.g., RRC signaling). For example, the BS may transmit, to the UE, TCI state configuration/information related to reception of the CSI-RS, considering application of the above-described proposed methods (e.g., proposals 1/2/2-1/2-2/2-3/3). Here, the CSI-RS may be a CSI-RS for CSI acquisition and/or a CSI-RS for beam management.

The BS may transmit, to the UE, the CSI-RS based on the TCI-related configuration/information transferred in S1910 and S1920 (S1930). For example, when the TCI state, UL SRS is based on the reference RS, the BS may configure/instruct the UE to receive CSI-RS using the reference RS-related reception beam (or spatial Rx parameter, spatial Rx filter) as in the above-described proposed methods (e.g., proposals 1/2/2-1/2-2/2-3/3).

Further, the above-described network side/TRP/BS operation and/or UE operation (e.g., proposals 1/2/2-1/2-2/2-3/3 and/or FIG. 15/FIG. 16/FIG. 17/FIG. 18/FIG. 19) may be implemented by a device (e.g., FIGS. 22 to 26) to be described below. For example, the network side/TRP/BS may correspond to a transmission device/first device, and the UE may correspond to a reception device/second device and, in some cases, vice versa.

Further, the above-described network side/TRP/BS and/or the UE operation (e.g., proposals 1/2/2-1/2-2/2-3/3 and/or FIG. 15/FIG. 16/FIG. 17/FIG. 18/FIG. 19) may be processed by at least one processor (e.g., 102 and 202 of FIG. 23), and the BS and/or UE operations (e.g., proposals 1/2/2-1/2-2/2-3/3 and/or FIG. 15/FIG. 16/FIG. 17/FIG. 18/FIG. 19) may be stored in the memory (e.g., the memory 104/204 of FIG. 23), in the form of a command/program (e.g., instruction or executable code) for driving at least one processor (e.g., 102 or 203 of FIG. 23).

The above-described embodiments are described below in detail with reference to FIG. 20 in terms of the operation of the UE. Further, the embodiments and/or methods described in the disclosure are differentiated solely for ease of description, and some components in any one method may be replaced, or combined with components of another method.

FIG. 20 is a flowchart illustrating a method for receiving a downlink signal by a UE in a wireless communication system according to an embodiment of the disclosure.

Referring to FIG. 20, according to an embodiment of the disclosure, a method for receiving a downlink signal by a UE in a wireless communication system may include the step S2010 of receiving configuration information related to transmission configuration indicator state and the step S2020 of receiving a downlink signal.

In S2010, the UE receives configuration information related to a transmission configuration indicator (TCI) state from the base station.

According to an embodiment, the configuration information may include a list of a specific number of candidate TCI states. The configuration information may be based on an RRC message (e.g., PDSCH-Config).

According to an embodiment, the configuration information may include a list of the specific number of candidate TCI states and an indication for a specific TCI state. In this case, the indication for the specific TCI may be included in the scheduling information (e.g., DCI) of the downlink signal and transmitted separately.

According to an embodiment, the configuration information may be based on the configuration information for FIGS. 15 to 19. As an example, the configuration information may be based on the TCI state-related configuration information (TCI state related Config) and PDCCH-related configuration information (PDCCH related Config) of FIG. 17. As another example, the configuration information may be based on the TCI state-related configuration information (TCI state related Config) and CSI-related configuration information (CSI related Config) of FIG. 19.

The TCI state-related configuration information (TCI state related Config) and downlink signal-related configuration information (e.g., PDCCH related Config, CSI-RS related Config) included in the configuration information may be separately transmitted.

According to an embodiment, the configuration information may include information indicating an uplink (UL) reference RS. Specifically, the TCI state included in the configuration information may include information indicating an uplink reference RS (UL reference RS). This embodiment may be based on proposal 1 described above.

According to an embodiment, the uplink reference RS may be based on a sounding reference signal (SRS). This embodiment may be based on proposal 2 described above. In this case, the information indicating the UL reference RS may be based on a sounding reference signal resource indicator (SRI).

The SRS may be based on any one of a periodic SRS, a semi-persistent SRS, or an aperiodic SRS.

The SRS may be based on an SRS most recently transmitted before the configuration information is transmitted. As an example, the SRS may be based on an activated semi-persistent SRS.

The most recently transmitted SRS may be based on an SRS transmitted in specific time duration before a time when the configuration information is transmitted. The specific time duration may be a preset duration in relation to the capability of the UE. For example, the specific time duration may be related to calculation and configuration of the UE's uplink beam weight.

According to an embodiment, the UL reference RS may be based on a specific QCL type. The specific QCL type may be based on i) a QCL type different from a QCL type related to a spatial relation or ii) a QCL type configured separately from the QCL type related to the spatial relation. This embodiment may be based on proposal 3 described above.

The QCL type based on i) may be QCL type E. The QCL type based on ii) may be a QCL type based on newly defined spatial relation information.

The operation of receiving the configuration information related to the transmission configuration indicator (TCI) state by the UE (100/200 FIGS. 22 to 26) from the base station (100/200 of FIGS. 22 to 26) according to S2010 described above may be implemented by the device of FIGS. 22 to 26. For example, referring to FIG. 23, one or more processors 102 may control one or more transceivers 106 and/or one or more memories 104 to receive the configuration information related to the transmission configuration indicator (TCI) state from the base station 200.

The method may further include transmitting UE capability information before S2010. In the UE capability information transmission step, the UE transmits, to the base station, UE capability information related to the specific time duration. The configuration information may be determined based on the UE capability information. In other words, the uplink reference RS (UL reference RS) may be determined based on the UE capability information.

According to the above-described UE capability information transmission step, the operation of transmitting the UE capability information related to the specific time duration by the UE (100/200 of FIGS. 22 to 26) to the base station (100/200 of FIGS. 22 to 26) may be implemented by the device of FIGS. 22 to 26. For example, referring to FIG. 23, one or more processors 102 may control one or more transceivers 106 and/or one or more memories 104 to transmit, to the base station 200, UE capability information related to the specific time duration.

In S2020, the UE receives the downlink signal based on the configuration information from the base station.

According to an embodiment, the downlink signal may be received based on a spatial domain filter related to the UL reference RS. The spatial domain filter may be based on a spatial domain Rx filter corresponding to a spatial domain Tx filter for transmission of the UL reference RS.

According to S2020 described above, the operation of receiving the downlink signal based on the configuration information by the UE (100/200 of FIGS. 22 to 26) from the base station (100/200 of FIGS. 22 to 26) may be implemented by the device of FIGS. 22 to 26. For example, referring to FIG. 23, one or more processors 102 may control one or more transceivers 106 and/or one or more memories 104 to receive, from the base station 200, the downlink signal based on the configuration information.

The above-described embodiments are described below in detail with reference to FIG. 21 in terms of the operation of the base station. Further, the embodiments and/or methods described in the disclosure are differentiated solely for ease of description, and some components in any one method may be replaced, or combined with components of another method.

FIG. 21 is a flowchart illustrating a method for transmitting a downlink signal by a base station in a wireless communication system according to another embodiment of the disclosure.

Referring to FIG. 21, according to another embodiment of the disclosure, a method for transmitting a downlink signal by a base station in a wireless communication system may include the step S2110 of transmitting configuration information related to transmission configuration indicator state and the step S2120 of transmitting a downlink signal.

In S2110, the base station transmits configuration information related to a transmission configuration indicator (TCI) state to the UE.

According to an embodiment, the configuration information may include a list of a specific number of candidate TCI states. The configuration information may be based on an RRC message (e.g., PDSCH-Config).

According to an embodiment, the configuration information may include a list of the specific number of candidate TCI states and an indication for a specific TCI state. In this case, the indication for the specific TCI may be included in the scheduling information (e.g., DCI) of the downlink signal and transmitted separately.

According to an embodiment, the configuration information may be based on the configuration information for FIGS. 15 to 19. As an example, the configuration information may be based on the TCI state-related configuration information (TCI state related Config) and PDCCH-related configuration information (PDCCH related Config) of FIG. 17. As another example, the configuration information may be based on the TCI state-related configuration information (TCI state related Config) and CSI-related configuration information (CSI related Config) of FIG. 19.

The TCI state-related configuration information (TCI state related Config) and downlink signal-related configuration information (e.g., PDCCH related Config, CSI-RS related Config) included in the configuration information may be separately transmitted.

According to an embodiment, the configuration information may include information indicating an uplink (UL) reference RS. Specifically, the TCI state included in the configuration information may include information indicating an uplink reference RS (UL reference RS). This embodiment may be based on proposal 1 described above.

According to an embodiment, the uplink reference RS may be based on a sounding reference signal (SRS). This embodiment may be based on proposal 2 described above. In this case, the information indicating the UL reference RS may be based on a sounding reference signal resource indicator (SRI).

The SRS may be based on any one of a periodic SRS, a semi-persistent SRS, or an aperiodic SRS.

The SRS may be based on an SRS most recently transmitted before the configuration information is transmitted. As an example, the SRS may be based on an activated semi-persistent SRS.

The most recently transmitted SRS may be based on an SRS transmitted in specific time duration before a time when the configuration information is transmitted. The specific time duration may be a preset duration in relation to the capability of the UE. For example, the specific time duration may be related to calculation and configuration of the UE's uplink beam weight.

According to an embodiment, the UL reference RS may be based on a specific QCL type. The specific QCL type may be based on i) a QCL type different from a QCL type related to a spatial relation or ii) a QCL type configured separately from the QCL type related to the spatial relation. This embodiment may be based on proposal 3 described above.

The QCL type based on i) may be QCL type E. The QCL type based on ii) may be a QCL type based on newly defined spatial relation information.

The operation of transmitting the configuration information related to the transmission configuration indicator (TCI) state by the base station (100/200 FIGS. 22 to 26) to the UE (100/200 of FIGS. 22 to 26) according to S2110 described above may be implemented by the device of FIGS. 22 to 26. For example, referring to FIG. 23, one or more processors 202 may control one or more transceivers 206 and/or one or more memories 204 to transmit the configuration information related to the transmission configuration indicator (TCI) state from the UE 100.

The method may further include receiving UE capability information before S2110. In the UE capability information reception step, the base station receives, from the UE, base station capability information related to the specific time duration. The configuration information may be determined based on the base station capability information. In other words, the uplink reference RS (UL reference RS) may be determined based on the UE capability information.

According to the above-described UE capability information reception step, the operation of receiving the UE capability information related to the specific time duration by the base station (100/200 of FIGS. 22 to 26) from the UE (100/200 of FIGS. 22 to 26) may be implemented by the device of FIGS. 22 to 26. For example, referring to FIG. 23, one or more processors 202 may control one or more transceivers 206 and/or one or more memories 204 to receive, from the UE 100, UE capability information related to the specific time duration.

In S2120, the base station transmits, to the UE, the downlink signal based on the configuration information.

According to an embodiment, the base station may configure the UE to receive the downlink signal based on the spatial domain filter related to the uplink reference RS. In other words, a spatial domain filter for receiving the downlink signal may be related to the UL reference RS. The spatial domain filter may be based on a spatial domain Rx filter corresponding to a spatial domain Tx filter for transmission of the UL reference RS.

According to S2120 described above, the operation of transmitting the downlink signal based on the configuration information by the base station (100/200 of FIGS. 22 to 26) to the UE (100/200 of FIGS. 22 to 26) may be implemented by the device of FIGS. 22 to 26. For example, referring to FIG. 23, one or more processors 202 may control one or more transceivers 206 and/or one or more memories 204 to transmit, to the UE 100, the downlink signal based on the configuration information.

Example of Communication System Applied to Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 22 illustrates a communication system 1 applied to the disclosure.

Referring to FIG. 22, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure.

FIG. 23 illustrates wireless devices applicable to the disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 24 illustrates a signal process circuit for a transmission signal.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 25 illustrates another example of a wireless device applied to the disclosure.

The wireless device may be implemented in various forms according to a use-case/service (refer to FIG. 22). Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 22), the vehicles (100*b*-1 and 100*b*-2 of FIG. 22), the XR device (100*c* of FIG. 22), the hand-held device (100*d* of FIG. 22), the home appliance (100*e* of FIG. 22), the IoT device (100*f* of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

FIG. 26 illustrates a hand-held device applied to the disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

The downlink signal transmission/reception method and device in a wireless communication system according to embodiments of the disclosure provide the following effects.

According to an embodiment of the disclosure, configuration information related to a transmission configuration indicator (TCI) state includes information indicating an uplink reference RS (UL reference RS). A downlink signal is received based on the configuration information. Specifically, the downlink signal may be received based on a spatial domain filter related to the UL reference RS.

Accordingly, since an uplink reference signal (UL RS) is directly used as a reference RS for downlink beam indication, latency is reduced. Further, flexibility may be enhanced in an operation related to spatial relation configuration/association for indicating a downlink beam.

According to an embodiment of the disclosure, the uplink reference RS may be based on a sounding reference signal (SRS), and the SRS may be based on the most recently transmitted SRS before the configuration information is transmitted. Accordingly, ambiguity in the operation of the UE related to the reception beam determination based on the reception beam indication of the downlink signal may be removed.

According to an embodiment of the disclosure, the most recently transmitted SRS may be based on an SRS transmitted in specific time duration before a time when the configuration information is transmitted. In other words, the uplink reference RS (i.e., SRS) for indicating the reception beam of the downlink signal may be configured considering the time required for calculating and setting the uplink beam weight of the corresponding UE. Accordingly, the reception beam indication of the downlink signal may be performed more effectively based on the capability of the corresponding UE.

The embodiments of the disclosure described hereinbelow are combinations of elements and features of the disclosure. The elements or features may be considered selective unless otherwise mentioned. Each element or feature may be practiced without being combined with other elements or features. Further, an embodiment of the disclosure may be constructed by combining parts of the elements and/or features. Operation orders described in embodiments of the disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the disclosure or included as a new claim by subsequent amendment after the application is filed.

The embodiments of the disclosure may be achieved by various means, for example, hardware, firmware, software, or a combination thereof. In a hardware configuration, the methods according to the embodiments of the disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method performed by a user equipment (UE) in a wireless communication system, the method comprising:
receiving information related to a transmission configuration indicator (TCI) state; and
receiving a downlink signal based on the TCI state,
wherein the TCI state includes information for an uplink (UL) Reference Signal (RS),
and wherein the downlink signal is received based on a spatial domain receive filter related to a spatial domain transmission filter used for transmission of the UL RS.

2. The method of claim 1, wherein the UL RS is based on a sounding reference signal (SRS).

3. The method of claim 2, wherein the information for the UL RS is based on an SRS resource ID.

4. The method of claim 2, wherein the SRS is based on any one of a periodic SRS, a semi-persistent SRS, or an aperiodic SRS.

5. The method of claim 2, wherein the SRS is based on an SRS most recently transmitted before the configuration information is transmitted.

6. The method of claim 5, wherein the SRS is based on an activated semi-persistent SRS.

7. The method of claim 5, wherein the most recently transmitted SRS is based on an SRS transmitted in a time duration before a time when the configuration information is transmitted.

8. The method of claim 7, further comprising transmitting UE capability information related to the time duration.

9. The method of claim 1, wherein the UL RS is based on a specific Quasi Co-Location (QCL) type, and wherein the specific QCL type is based on i) a QCL type different from a QCL type related to a spatial relation or ii) a QCL type configured separately from the QCL type related to the spatial relation.

10. A user equipment (UE) configured to operate in a wireless communication system, the UE comprising:
one or more transceivers;
one or more processors controlling the one or more transceivers; and
one or more memories operably connectible to the one or more processors and storing instructions that, based on being executed by the one or more processors, configure the one or more processors to perform operations, wherein the operations include:
receiving information related to a transmission configuration indicator (TCI) state; and
receiving a downlink signal based on the TCI state,
wherein the TCI state includes information for an uplink (UL) Reference Signal (RS),
and wherein the downlink signal is received based on a spatial domain receive filter related to a spatial domain transmission filter used for transmission of the UL RS.

11. A method performed by a base station in a wireless communication system, the method comprising:
transmitting, to a user equipment (UE), information related to a transmission configuration indicator (TCI) state; and
transmitting, to the UE, a downlink signal based on the TCI state,
wherein the TCI state includes information for an uplink (UL) Reference Signal (RS),
wherein the downlink signal is received, by the UE, based on a spatial domain receive filter related to a spatial domain transmission filter used by the UE for transmission of the UL RS.

* * * * *